United States Patent
Watanabe et al.

(10) Patent No.: US 7,966,123 B2
(45) Date of Patent: Jun. 21, 2011

(54) DISPLAY DEVICE AND METHOD FOR VEHICLE

(75) Inventors: Akihiro Watanabe, Kariya (JP); Miki Kato, Kariya (JP); Kiyotaka Taguchi, Kariya (JP); Hidehiko Kawakami, Nagoya (JP); Hirokazu Shibata, Okazaki (JP)

(73) Assignee: DENSO CORPORATION, Kariya (JP)

( * ) Notice: Subject to any disclaimer, the term of this patent is extended or adjusted under 35 U.S.C. 154(b) by 1091 days.

(21) Appl. No.: 11/526,653

(22) Filed: Sep. 26, 2006

(65) Prior Publication Data

US 2007/0078598 A1    Apr. 5, 2007

(30) Foreign Application Priority Data

Sep. 28, 2005 (JP) ................. 2005-282429
Oct. 20, 2005 (JP) ................. 2005-305558
Oct. 31, 2005 (JP) ................. 2005-317321

(51) Int. Cl.
*G01C 21/30* (2006.01)

(52) U.S. Cl. ........ 701/211; 701/208; 701/212; 340/439; 340/461; 340/995.17

(58) Field of Classification Search .............. 701/208, 701/209, 211, 212; 340/438, 439, 461, 995.16, 340/995.17
See application file for complete search history.

(56) References Cited

U.S. PATENT DOCUMENTS

| | | | |
|---|---|---|---|
| 5,648,755 A | 7/1997 | Yagihashi | |
| 5,764,139 A | 6/1998 | Nojima et al. | |
| 6,314,369 B1 | 11/2001 | Ito et al. | |
| 6,411,877 B2 | 6/2002 | Böckmann et al. | |
| 6,954,696 B2 | 10/2005 | Ihara et al. | |
| 2003/0069689 A1 | 4/2003 | Ihara et al. | |
| 2005/0125145 A1 | 6/2005 | Sakashita et al. | |
| 2008/0027628 A1 | 1/2008 | Sakashita et al. | |
| 2008/0033633 A1 | 2/2008 | Akiyoshi et al. | |

FOREIGN PATENT DOCUMENTS

| | | |
|---|---|---|
| DE | 199 47 506 A1 | 4/2001 |
| JP | 01-229730 A | 9/1989 |
| JP | A-9-257523 | 10/1997 |
| JP | A-11-051686 | 2/1999 |
| JP | A-11-271073 | 10/1999 |

(Continued)

OTHER PUBLICATIONS

Office Action dated May 27, 2009 from the Japan Patent Office in the corresponding JP application No. 2005-305558 (and English Translation).

Office Action dated Feb. 5, 2010 from Japanese Patent Office in corresponding JP application No. 2005-305558 (and English translation).

Notice of Rejection mailed on Apr. 20, 2010 issued from the Japanese Patent Office in the corresponding Japanese patent application No. 2005-282429 (and English translation).

Office Action mailed Aug. 31, 2010 issued from the Japanese Patent Office in corresponding Japanese patent application No. 2005-282429 (and English translation).

*Primary Examiner* — Gertrude Arthur Jeanglaud
(74) *Attorney, Agent, or Firm* — Posz Law Group, PLC

(57) ABSTRACT

A display device for a vehicle has a display unit that has a meter display area and a navigation display area. The meter display area displays vehicle operation condition, and the navigation display area displays travel route guidance. When a display color changes in the travel route guidance in the navigation display area, color of the vehicle operation condition in the meter display area is also changed so that the color of the travel route guidance becomes more eye-catching than the vehicle operation condition.

28 Claims, 21 Drawing Sheets

FOREIGN PATENT DOCUMENTS

| | | |
|---|---|---|
| JP | A-2002-340600 | 11/2002 |
| JP | A-2004-085330 | 3/2004 |
| JP | 2004-144547 A | 5/2004 |
| JP | 2004-151026 A | 5/2004 |
| JP | A-2004-151027 | 5/2004 |
| JP | A-2004-157434 | 6/2004 |
| JP | A-2004-177148 | 6/2004 |
| JP | A-2004-251722 | 9/2004 |

| NAVIGATION DISPLAY AREA | METER DISPLAY AREA |
|---|---|
| MAP (DAY) | COLOR 1 |
| MAP (NIGHT) | COLOR 2 |
| INTERSECTION (DAY) | COLOR 3 |
| INTERSECTION (NIGHT) | COLOR 4 |
| ALARM (DAY) | COLOR 5 |
| ALARM (NIGHT) | COLOR 6 |
| CUSTOMIZED (DAY) | COLOR 7 |
| CUSTOMIZED (NIGHT) | COLOR 8 |
| ⋮ | ⋮ |

| MONITOR AREA | AREA SPECIFYING INFORMATION | COLOR SPECIFYING INFORMATION | | |
|---|---|---|---|---|
| ○ | AREA 1 | HUE 1 | CHROMA 1 | BRIGHTNESS 1 |
| ○ | AREA 2 | HUE 2 | CHROMA 2 | BRIGHTNESS 2 |
| ○ | AREA 3 | HUE 3 | CHROMA 3 | BRIGHTNESS 3 |
| ○ | AREA 4 | HUE 4 | CHROMA 4 | BRIGHTNESS 4 |
| × | AREA 5 | HUE 5 | CHROMA 5 | BRIGHTNESS 5 |
| ○ | AREA 6 | HUE 6 | CHROMA 6 | BRIGHTNESS 6 |
| ⋮ | ⋮ | ⋮ | ⋮ | ⋮ |

FIG. 31
| RESTRICTION TARGET COLOR 1 | RESTRICTION TARGET COLOR 2 | RESTRICTION TARGET COLOR 3 | RESTRICTION TARGET COLOR 4 | RESTRICTION TARGET COLOR 5 | ... |
|---|---|---|---|---|---|
| CONVERSION COLOR 1 | CONVERSION COLOR 2 | CONVERSION COLOR 3 | CONVERSION COLOR 4 | CONVERSION COLOR 5 | ... |
FIG. 32
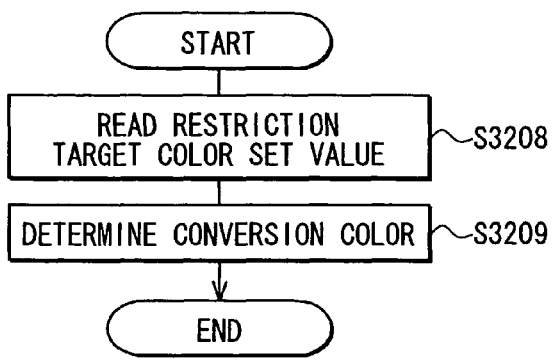
FIG. 33
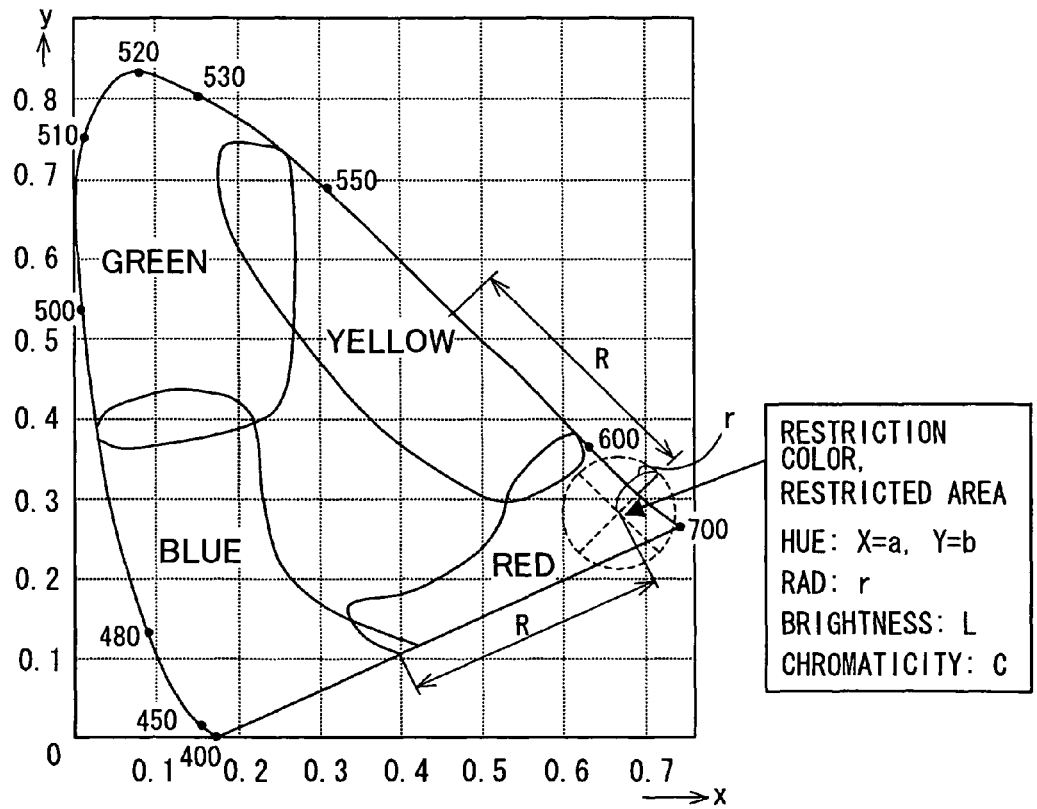

FIG. 34
| AREA 1 | AREA 2 | AREA 3 | AREA 4 | AREA 5 | ... |
|---|---|---|---|---|---|
| CONVERSION COLOR 1 | CONVERSION COLOR 2 | CONVERSION COLOR 3 | CONVERSION COLOR 4 | CONVERSION COLOR 5 | ... |
FIG. 35
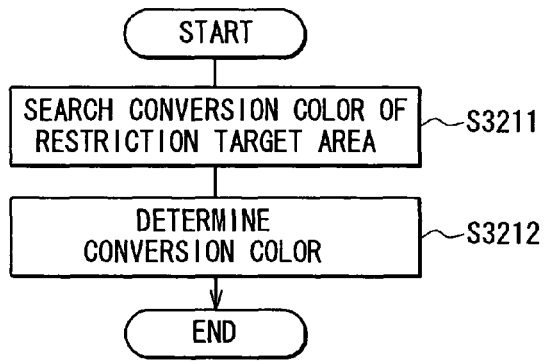
FIG. 36
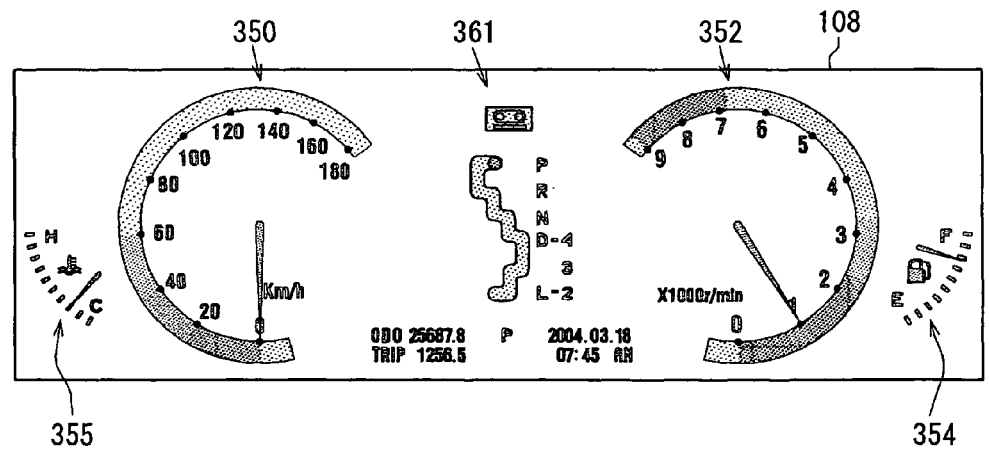

DISPLAY DEVICE AND METHOD FOR VEHICLE

CROSS REFERENCE TO RELATED APPLICATION

This patent application is based on and incorporates herein by reference Japanese patent applications No. 2005-282429 filed on Sep. 28, 2005, No. 2005-305558 filed on Oct. 20, 2005, and No. 2005-317321 filed on Oct. 31, 2005.

FIELD OF THE INVENTION

The present invention relates to a display device for displaying information associated with the travel of a vehicle, and particularly to a display device that can control color while dividing a display area into at least two areas.

BACKGROUND OF THE INVENTION

According to a display device disclosed in JP-A-7-198425 or the like, information to which a driver pays attention is predicted on the basis of the travel state of a vehicle, the driving state of a driver, etc. The information to which the driver should pay attention is preferentially displayed on the display device to enhance the visibility. Specifically, for example, it is estimated on the basis of variations in the speed of a vehicle, the steering angle, the gear shift, etc. whether the vehicle travels on a mountain path or not. When it is estimated that the vehicle travels on a mountain path, displays of a tachometer, a boost pressure, a brake, etc. are enlarged. In the case of the mountain path travel, weight is more frequently attached to the engine state and the braking state. In the above display device, the visibility is enhanced by changing the color.

However, even when a specific meter is displayed in a scale-up mode or displayed with an eye catching color, the visibility might be caused to be degraded contrary to expectation if the display style of the specific meter lacks balance to those of other meters. Furthermore, the visibility may not be properly enhanced even in a case where color of a specific meter group is changed according to user's predilection or the like.

In JP-A-2004-157434, a display of a navigation is made in addition to a meter display, so that an analog meter image having an indicating pointer and an indicating pointer turning region are displayed. A ring image is displayed along the outer periphery of the indicating pointer turning region, and also the ring image is displayed as a glossy display to thereby enhance a visual effect or the like.

In JP-A-11-51686, a route guidance device provides a display of a navigation device. It also provides a vehicle stop mode for displaying necessary information in a small display frame on an LCD (Liquid Crystal Display) device at the vehicle stop time, and a vehicle travel mode for displaying necessary information in a large display frame on the LCD device at the vehicle travel time for displaying a navigation guide image containing a map, the present position, a guide route at the route guidance time in a small display frame on the LCD device. These modes are switched over in accordance with the speed of the vehicle.

Specifically, there are two display constructions. In one display construction shown in FIG. 9, a meter display area for meter display and a navigation data display area for navigation display are displayed on a display unit 54. In the other display construction shown in FIG. 10, a display unit 54 for displaying navigation data and a meter display unit 59 containing a stepper motor for moving a meter indicating pointer, LED, etc. are contained in a meter 50 as shown in FIG. 10. In each of these display constructions, drawing data for navigation display are created in a navigation device 20, and combined with drawing data from a meter ECU 40 by a drawing ECU 60 or a circuit equivalent to the drawing ECU 60 to create drawing data for meter display. Then the drawing data for meter display are displayed on the display unit 54. In the display construction shown in FIG. 10, only the drawing data for navigation display are displayed on the display unit 54, and the meter ECU 40 creates no meter drawing data and controls the meter display unit 59.

However, in the above display construction, the meter (meter ECU 40) and the navigation device 100 create drawing data separately from each other, and thus a new navigation device 20 must be developed or improved every time the design of the meter is changed. Furthermore, there may be used a method of changing a display design of the navigation device 20 in conformity with the design of the meter 50 by the user. However, the operation required to the user is cumbersome.

Furthermore, for example in a case where a warning indicator is displayed in the meter, the recognition rate of the warning to be transmitted to the user may be lowered when the navigation display is bright or when the navigation display uses the same color as the warning indicator.

In a case where the display size or display position of the navigation display can be varied in the meter 50, if the optimum navigation display style (the number of roads, the number/size of landmarks, the number/size of characters, etc.) cannot be changed in accordance with the size or position, a display would be rare in spite of a large screen or dense in spite of a small screen, so that information necessary for a user cannot be provided and thus an appearance is not acceptable. Furthermore, the user may use a method of changing the navigation display style, however, the operation of the user becomes cumbersome.

There is a method of making unclear the outer edge portion of the navigation display area which comes into contact with the meter display area and gradually varying the color of the outer edge portion toward the meter display area by using gradation processing or the like. However, when the background color of the meter is varied, the profile of the navigation display area is made clear, or when the same color as the meter display area is used for the outer edge portion of the navigation display area, the gradation effect is lowered.

Furthermore, in the above display device, a screen of the navigation device (navigation screen) is installed in a cockpit portion containing a meter. Thus, the meter and the navigation screen are accommodated within a proximate viewing field at the front side of the driver, so that the driver can check the navigation screen without greatly changing his/her eye line from the eye line at the meter viewing time. However, the following disadvantage also exists while inextricably linked to the above advantage.

That is, information displayed on the meter may contain actuation information of a warning indicator group. In order to indicate that the information concerned has high priority or high urgency, the indicators of the warning indicator group are displayed by turning on LED or an output of a specific image or graphic while emphasized with color tone such as red color, orange color which is more eye-catching than the other colors. However, when a colorful navigation screen is simultaneously output in proximity to the indicators, the information to be originally emphasized is under cover of the display color of the navigation screen within the viewing field, so that the indicators becomes less eye-catching. Therefore, the priority or urgency of notification is not transmitted to the driver. Particularly when a graphic having the same color tone as the turn-on color of the indicator group is displayed on the navigation screen, the driver's attention is dispersed to the graphic concerned, and thus the above problem particularly easily arises.

SUMMARY OF THE INVENTION

A first object of the present invention is to provide a display device having excellent visibility particularly from the viewpoint of color when information associated with vehicle travel is displayed.

A second object of the present invention is to provide a display device for providing map information, etc. that are easily viewable to a user.

A third object of the present invention is to provide a display device, which displays warning or the like at a main area side of a meter without being obstructed by an output at an auxiliary image side, so that an emphasis effect of the display concerned can be kept even when an auxiliary image such as a navigation screen and a meter main area comprising a meter and an indicator group are arranged in proximity to each other.

In order to attain the first object, a display device has a display area that has first and second areas and displays information associated with the travel of a vehicle on these areas by using objects, and a color changing unit for changing color of objects displayed in the first area on the basis of color of objects displayed in the second area. Specifically, the "objects" mean characters, graphics (contains the background), etc. The first and second areas are not required to have fixed size and shape, and the size, the shape, etc. may be dynamically varied. According to the display device, for example, necessary information can be effectively transmitted to the user while keeping the color balance of the overall display area.

Even when the color of the second area is changed according to the user's fancy, the color of the objects displayed in the first area is automatically changed in conformity with the change of the color of the second area, so that the visibility will not be degraded due to the setting of the color by the user.

The function of the color changing unit may be implemented by a program. If a computer contained in the display device is made to execute such a program, the same effect as the display device described above can be retrieved. Furthermore, the program can be distributed by using a network or the like, because exchange of programs in the display device is easier than exchange of parts. Accordingly, the function of the display can be easily enhanced.

In order to attain the second object, a display device has a display unit having a meter display area for displaying a meter and a navigation data display area for displaying a navigation system. A drawing unit makes a drawing on the display unit. A meter control unit provides meter information, and a meter information retrieving unit retrieves the meter information from the meter control unit. A navigation control unit creates meter display navigation data to be displayed in the navigation data display area in accordance with the retrieved meter information and transmitting the meter display navigation data thus created to the drawing unit. The meter control unit may further transmit meter drawing data to be displayed in the meter display area to the drawing unit. The meter information may contain at least one of display color information of the meter, character design information, display brightness information, and information associated with a size of the navigation data display area or a display position of the navigation data display area on the meter.

In order to attain the third object, in a display device, when an emphasis display area exists in a meter main area and a graphic area having the same type color tone as the emphasis display area under an emphasized display state exists in an auxiliary image, the graphic area concerned is set as a restriction target monitor area, which is to be monitored. The display color of the restriction target monitor area is converted to a post-restricting set color having a larger color difference from an emphasized display color than a pre-restricting set color in connection with the switching operation of the emphasis display area from a non-emphasized display state to an emphasized display state. That is, when the emphasis display area is set to the emphasized display state, it is restricted that a graphic area having the same type color as an auxiliary image is displayed in the auxiliary image. Thus, the color emphasis effect of the output of the emphasis display area is less diminished by the displayed graphic in the auxiliary image.

Here, the phrase "having the same type color tone" means that the chromaticity coordinate on the color space is identical, however, it should be regarded that two colors which make the driver feel ambiguous belong to the same type color tone although these colors are not strictly identical to each other. However, the proximity degree between the two color tones at which the driver feels "the same type color tone" for the color tones has a personal difference. It is dependent on disturbance light or the physical condition of the driver. For example, when the color difference on the uniform color space (the distance between two chromaticity coordinates plotted in the uniform color space) is within a fixed range, for example, when the color difference in the L*a*b* color system defined in JIS:Z8730 is converged within 30, the two colors can be grasped as "having the same type color tone". At any rate, in order to prevent the disadvantage that the display color of a graphic area in an auxiliary image is proximate to the display color of the auxiliary image and thus these display colors are not discriminable from each other or which display should be originally emphasized is lost from the driver's intention, the display color of the graphic area in the auxiliary image is restricted so that the color difference between the two display colors is increased.

The emphasis display area is a warning display area of setting the display state to the emphasized display state on the basis of warning activating information contained in basic operation state information, for example. By increasing the color difference between the display color of the graphic in the auxiliary image and the display color of the warning display area, the emphasis effect of the warning display can be enhanced, and the recognition response of the warning display can be enhanced.

The display colors of the meter and the indicators are not restricted in any case. However, it is desirable to use a display color matched with a display target image. For example, display colors may be selected in the order of (red, orange type)•(yellow type)•(green, blue type) as the importance level or urgency of warning is shifted to the lower side. Particularly, with respect to the warning display area having the higher importance level or urgency, it is desirable that the hue of the emphasized display color to be set is settled within a section extending from 10YR through 10R to 10P (the section dominated by red, orange type colors).

Next, the meter main area can be integrally displayed together with the auxiliary image display area on the display panel having the color pixel matrix for image display. With this construction, the meter, the indicator group and the auxiliary image display area can be constructed with a single display device, and the hardware cost and the labor of the assembly can be omitted. In addition, the degree of freedom and flexibility on the design of the meter group can be greatly enhanced. In this case, the emphasis display area can be set as a restricting origin monitor area as a graphic area displayed on the display panel together with a meter image with an emphasized display color. Accordingly, the emphasis display area can be unitarily managed/controlled on the basis of color setting condition on the image together with the restriction target monitor area in accordance with the set display color according to the software processing for display. The image of the meter is frequently referred to by the driver when the driver drives the vehicle. There may exist a driver who feels odd when the emphasis display area is contained in the meter. In this case, the image of the meter may be formed so that it does not contain the emphasis display area.

The auxiliary image can be set as an output image (navigation image) of the navigation device, for example. The driver can refer to driving auxiliary information associated with route guidance, etc. without greatly turning his/her eye lines away from the meter group to which the driver refers during driving, so that route guidance can be more smoothly performed. In this case, when a specific landmark, a present position pointer or the like is displayed with the same color as the emphasis display area, the attention of the driver to the emphasis display area is dispersed, which causes reduction of the emphasis effect.

The present display is particularly effectively applied to the navigation image which the driver frequently refers to. For example, the output image contains a map image for route guidance of the navigation device, so that the driver's visual attention is more positively paid to the graphic image of the present position pointer indicating the present position of the vehicle on the map image to grasp the route. Accordingly, in a case where the present position pointer is displayed with the same type color as the emphasis display color, the attention to the emphasis display area would be remarkably lost if the driver's attention is concentrated onto the present position pointer even when the emphasis display area having the same color is newly turned on or the image thereof is output. Therefore, when the present position pointer is set as a restriction target monitor area and the emphasis display area is under the emphasized display state, it is very effective to impose the above restriction on the display color thereof.

A display color restricting conversion unit can convert the pre-restriction set color to a post-restriction set color whose hue is displaced from the post-restriction set color by a fixed amount or more. Accordingly, the restriction target monitor area can be made different in the level of hue with respect to the emphasis display color to thereby enhance the emphasis display effect. For example, the case where the emphasis display color is set in the section passing from 10YR through 10R to 10P which is dominated by the red, orange type colors on the hue circle is set in the section passing from 5GY through 5GB to 5PB which is dominated by blue, green type colors on the hue circle, the identification of the emphasis display area can be particularly enhanced.

A display color restricting conversion unit may convert a pre-restriction set color to a post restriction set color in which at least one of color saturation and brightness is reduced from the pre-restriction set color by a fixed amount or more. The reduction in color saturation and brightness of the display color of the restriction target monitor area means that an eye-catching or conspicuous element is suppressed in color as compared with the emphasis display area, which contributes to enhancement of the identification of the emphasis display area.

Particularly, when the meter main area is integrally displayed together with the auxiliary image display area on the display panel, the display control unit can be designed so that the color saturation of the restriction origin monitor area is reduced together with the peripheral image area. Under the emphasized display state, with respect to images other than the emphasis display area, the intensities of the colors thereof are weakened, whereby the display color of the emphasis display area can be made relatively more conspicuous. By approaching the color saturation of these images to zero (or setting the hue of the images to the same hue as the peripheral image area and setting the color saturation to a value smaller than the emphasis display area), these images can be set to gray scale images (monochromatic images).

The display color restricting conversion unit can convert the pre-restriction display color to the post-restriction display color according to various kinds of algorithms. For example, a chromaticity coordinate point which is spaced from the chromaticity coordinate point corresponding to the pre-restriction set color by a predetermined distance on a predetermined chromaticity diagram is found out, and the display color corresponding to the chromaticity coordinate point concerned can be set as the post-restriction set color. As described above, any pre-restriction display color can be provided with a color difference from the post-restriction display color in a necessary level, and the discrimination on color between the emphasis display area and the restriction target monitor area can be surely enhanced.

BRIEF DESCRIPTION OF THE DRAWINGS

The above and other objects, features and advantages of the present invention will become more apparent from the following detailed description made with reference to the accompanying drawings. In the drawings:

FIG. 31 is a conceptual diagram showing a first example of a conversion table;

FIG. 32 is a flowchart showing a third example of the color conversion processing;

FIG. 33 is a diagram showing the concept of color conversion processing on a chromaticity diagram;

FIG. 34 is a table showing a second example of the conversion table;

FIG. 35 is a flowchart showing a fourth example of the color conversion processing;

FIG. 36 is a front view showing a first modification of an auxiliary image;

DETAILED DESCRIPTION OF THE PREFERRED EMBODIMENTS

First Embodiment

Figure 1:
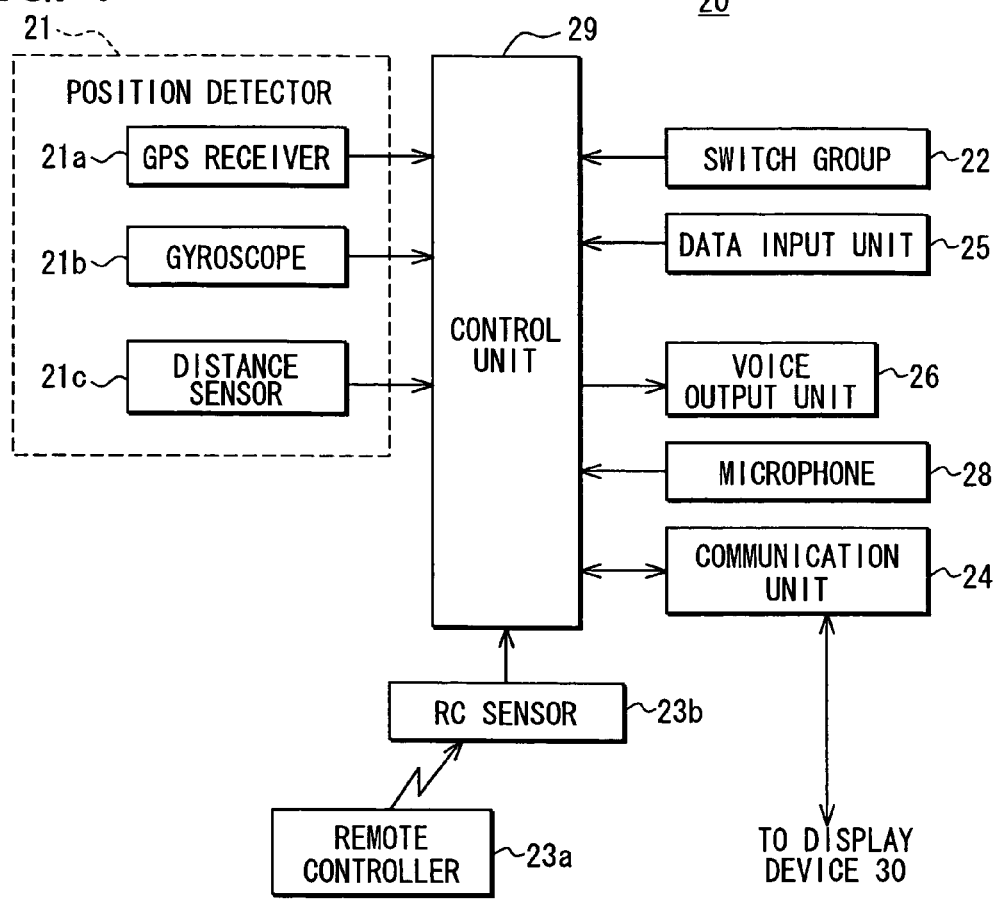
FIG. 1 is a block diagram showing a navigation device associated with a display device according to a first embodiment of the present invention

Referring to FIG. 1, a navigation device 20 is mounted in a vehicle. It is equipped with a position detector 21 for detecting the present position of a vehicle, an operation switch group 22 for inputting various kinds of instructions from a user, a remote control terminal (remote controller) 23a that inputs various kinds of instructions as in the case of the operating switch group 22 and is provided separately from the navigation device 20, a remote controller sensor 23b for inputting a signal from the remote controller 23a, a communication unit 24 having the function of communicating with a display device 30 shown in FIG. 2, a map data input unit 25 for inputting data from a map storage medium in which map data, voice data, etc. are recorded, a voice output unit 27 for outputting various kinds of guide voices, etc., a microphone 28 for outputting electrical signals based on voices uttered by the user, and a control unit 29. The control unit 29 executes various kinds of processing in accordance with inputs from the position detector 21, the operating switch group 22, the remote controller sensor 23b, the communication unit 24, the map data input unit 25 and the microphone 28 and controlling the communication unit 24 and the voice output unit 26.

The position detector 21 is equipped with a GPS receiver 21a for receiving radio waves from artificial satellites for GPS (Global Positioning System) through GPS antennas (not shown) and outputting the reception signal, a gyroscope 21b for detecting the magnitude of a rotational motion applied to a vehicle, and a distance sensor 21c for detecting the travel distance of the vehicle on the acceleration in the forward and backward directions of the vehicle, etc. The control unit 29 calculates the position, azimuth, speed, etc. of the vehicle on the basis of the output signals from respective sensors 21a to 21c. Various kinds of methods are known for calculating the present position on the basis of the output signal from the GPS receiver 21a, and any method of an independent positioning method and a relative positioning method may be used.

The operating switch group 22 is constructed with a mechanical key switch, etc., and inputs various instructions from the user.

The communication unit 24 is connected to the display device 30 (specifically, connected to a communication unit 32 of the display device 30), and carries out communications with the display device 30. The communication unit 24 mainly transmits image data of an image displayed on the display device 30.

The map data input unit 25 is for inputting various kinds of data stored in the map data storage medium (for example, a hard disc, DVD-ROM or the like). In the map data storage medium are stored map data (node data, link data, cost data, background data, road data, appellation data, mark datan intersection data, data of facilities, etc.), voice data for guidance, voice recognition data, etc. In place of inputting of these data from the map data storage medium, these data may be input through a communication network.

The voice output unit 26 can output voices for guides of facilities and various kinds of guidance.

When the user inputs a voice (utters), the microphone 28 outputs the electrical signal (voice signal) based on the input voice to the control unit 29. The user can operate the navigation device 20 by inputting various voices to the microphone 28.

The control unit 29 mainly comprises a well-known microcomputer constructed with a CPU, a ROM, a RAM, a SRAM, an I/O and a bus line for connecting these elements, and executes various kinds of processing on the basis of programs stored in the ROM and the RAM. For example, the control unit 29 executes the processing of calculating the present position of the vehicle as a pair of the coordinate and the travel direction on the basis of each detection signal from the position detector 21 and displaying on the display device 30 a map, etc. in the neighborhood of the present position which are read through the map data input unit 25, the route calculating processing of calculating the optimum route from the present position to a destination on the basis of the map data stored in the map data input unit 25 and the destination set according to the operations of the operating switch group 22, the remote controller 23a, etc., the route guidance processing for displaying the calculated route on the display device 30 and outputting voices to the voice output portion 27 to guide the route.

Figure 2:
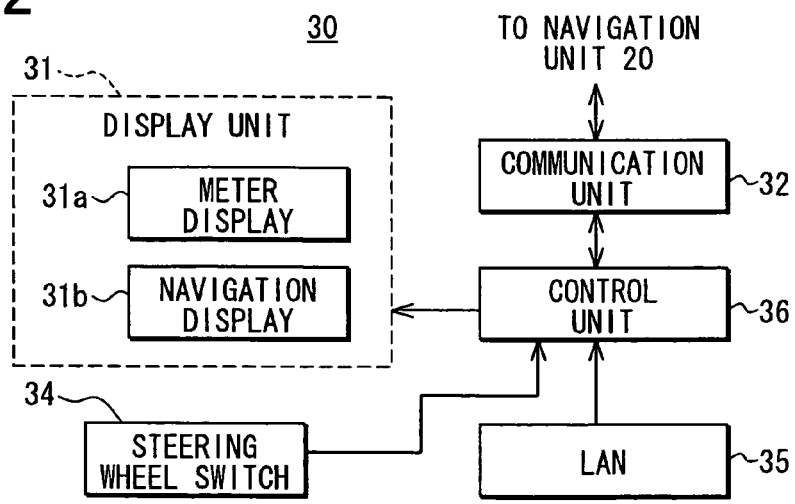
FIG. 2 is a block diagram showing the display device according to the first embodiment.

As shown in FIG. 2, the display device 30 is equipped with a display unit 31, a communication unit 32, a steering wheel switch 34, an in-vehicle LAN communication unit 35 and a control unit 36.

The display unit 31 is a color image display device, and it may be constructed with a liquid crystal display, an organic EL display or the like. The display area may be divided into a meter display area 31*a* and a navigation display area 31*b*.

The meter display area 31*a* is a display area for displaying speed information, the revolution speed of the engine, the fuel residual amount, the engine cooling water temperature, etc. received from various kinds of control units (not shown) through the in-vehicle LAN communication unit 35 as analog style images.

The navigation display area 31*b* is a display area for displaying a navigation image received from the navigation device 20 through the communication unit 32 (the images such as the map in the neighborhood of the present position, an icon indicating the present position, a guide map for guiding the route, etc.).

The communication unit 32 is connected to the navigation device 20 (specifically, connected to the communication unit 24 of the navigation device 20), and carries out the communications with the navigation device 20. The communication unit 32 mainly receives the image data of the images displayed on the display unit 31.

The steering wheel switch 34 is a switch provided to the steering wheel of the vehicle, and it is pressed when the changed color of the display unit 31 is to be returned to the original one.

The in-vehicle LAN communication unit 35 is for carrying out communications with various kinds of ECU (for example, an engine ECU, AT-ECU, etc.) connected to an in-vehicle LAN (not shown).

The control unit 36 is mainly constructed with a well-known microcomputer comprising CPU, ROM, RAM, SRAM, I/O and a bus line for connecting these elements, and executes various kinds of processing on the basis of programs stored in ROM and RAM. For example, it executes the processing of displaying the map image on the navigation display area 31*b* of the display unit 31 on the basis of image data transmitted from the navigation device 20, the processing of displaying on the meter display area 31*a* of the display unit 31 the vehicle speed, the number of revolutions of the engine, the fuel residual amount, the engine cooling water temperature, etc., by an analog display on the basis of the data received from the various kinds of ECUs through the in-vehicle LAN communication unit 35, color changing processing described later, etc.

Next, the color changing processing which is particularly associated with the present invention in the processing executed by the control unit 36 of the display device 30 will be described with reference to the flowchart of FIG. 3. The execution of the color changing processing is started when power supply to the display device 30 is started.

When starting to execute the color changing processing, the control unit 36 checks whether the color of the image displayed in the navigation display area 31*b* has been changed or not (S11). In this case, the checking "whether the color of the image has been changed" corresponds to the determination that "the color has been changed" when the navigation image is changed from a daytime image to a night image, or the determination that "the color has been changed" when the navigation image is changed from the map to the intersection enlarged view and thus the overall color tendency is changed. When the variation amount of the histogram of the image displayed in the navigation display area 31*b* exceeds a predetermined threshold value, "the color has been changed" may be determined.

If it is determined in S11 that the color of the image displayed in the navigation display area 31*b* has been changed (S11: YES), the processing proceeds to S12. If it is determined that the color of the image displayed in the navigation display area 31*b* has not been changed (S11: NO), the processing proceeds to S14.

Figures 3, 4:
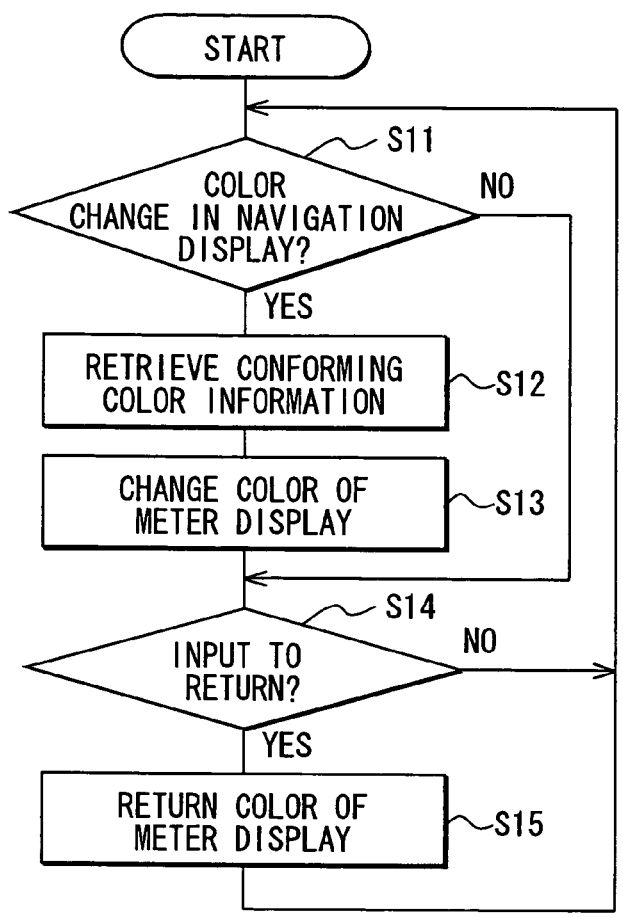
FIG. 3 is a flowchart showing color changing processing.
FIG. 4 is a table showing a color relation.

In S12, color information conforming with the color of the image displayed in the navigation display area 31*b* is retrieved by referring to a color table defined as shown in FIG. 4. The color table is stored in the SRAM of the control unit 36, and the color information of the meter display area 31*a* which is conforming with the color of the navigation display area 31*b* is registered. Here, the color table will be described with reference to FIG. 4.

Color identification information of the navigation display area 31*b* (identification codes of map color (for daytime), map color (for night), intersection graphics color (for daytime), intersection graphics color (for night), user customized color (for daytime), etc.) and color information of the meter display area 31*a* (color patterns compartmentalized by color 1, color 2, color 3, etc.) are registered in association with each other in the color table. For example, when the color of the navigation display area 31*b* is changed to the map color (for night), the color 2 is read out as the color of the meter display area 31*a* from the color table, and the color pattern called as the color 2 is used.

The "map color" means the color when a map for route guidance is displayed. The "intersection graphics color" means the color when an intersection is displayed in a scale-up mode. The "alarm color" means the color when an alarm for notifying existence of a curve or a crossing place is displayed. The "user customized color" means the color when a screen constructed with color which is freely set by a user is displayed. The color information of the meter display area 31*a* is registered so that color balance when information is displayed in the display device 30 is kept to be better suited as a whole in the relationship with the color indicated by the color identification information of the navigation information area. However, with respect to the "alarm color", the color of the meter display area 31*a* is set and registered so that the image displayed in the navigation display area 31*b* is particularly emphasized (for example, the color having complementary color relationship with the color of the navigation display area 31*b*).

Subsequently, in S13, the color of the image displayed in the meter display area 31*a* is changed on the basis of the color information retrieved in S12, and then the processing proceeds to S14. Before the color is changed, the color information before the change is stored in the RAM of the control unit 36.

In S14, it is determined whether there is an input meaning that the changed color is to be returned to the original one. Here, the "input" means an input accepted by the steering wheel switch 34. If the steering wheel switch 34 is pressed, it is determined that there is an input. If the steering wheel switch 34 is not pressed, it is determined that there is no input.

In S14, if it is determined that there is an input meaning the restoration of the color to the original one (S14: Yes), the processing proceeds to S15. If it is determined that there is no input meaning the restoration of the color to the original one (S14: No), the processing is returned to S11.

In S15 to which the processing proceeds when it is determined that there is an input meaning the restoration of the color to the original one, the color of the image displayed in the meter display area 31*a* is returned to the color before the change on the basis of the color information stored in RAM of the control unit 36. Then, the processing is returned to S11. When the color change has not been made, no operation is taken in this step (S15).

Next, an aspect of the display unit 31 which varies through execution of the color changing processing will be described with reference to FIGS. 5 to 8.

Figure 5:
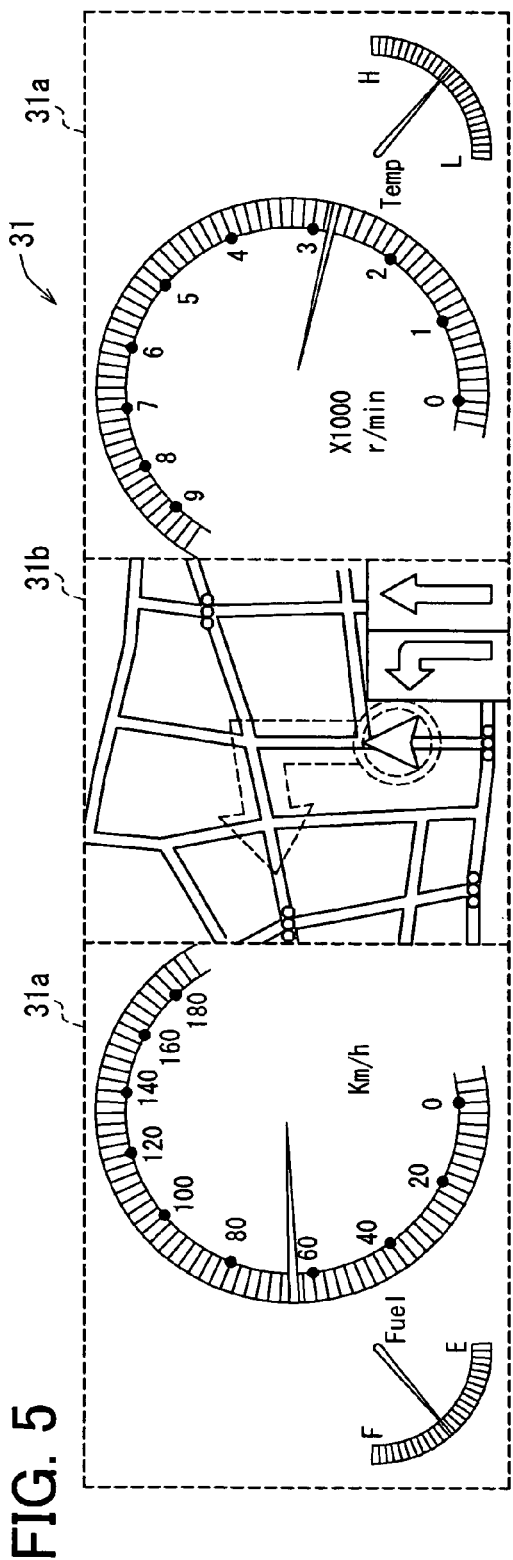
FIGS. 5 and 6 are front views showing aspects of color changed by the color changing processing.

On the display unit 31 shown in FIG. 5, the vehicle speed and the fuel residual amount are displayed like analog meters in the meter display area 31a at the left side, and the number of revolutions of the engine and the engine cooling water temperature are displayed like analog meters in the meter display area 31a at the right side and the daytime map for route guidance is displayed in the navigation display area 31b.

Here, it is assumed that day is changed to night and thus the external environment of the vehicle gets dark. In this case, it is also assumed that the map displayed in the navigation display area 31b is changed to the map for night by the function of the navigation apparatus 20 in order to enhance the visibility of the map.

Figure 6:
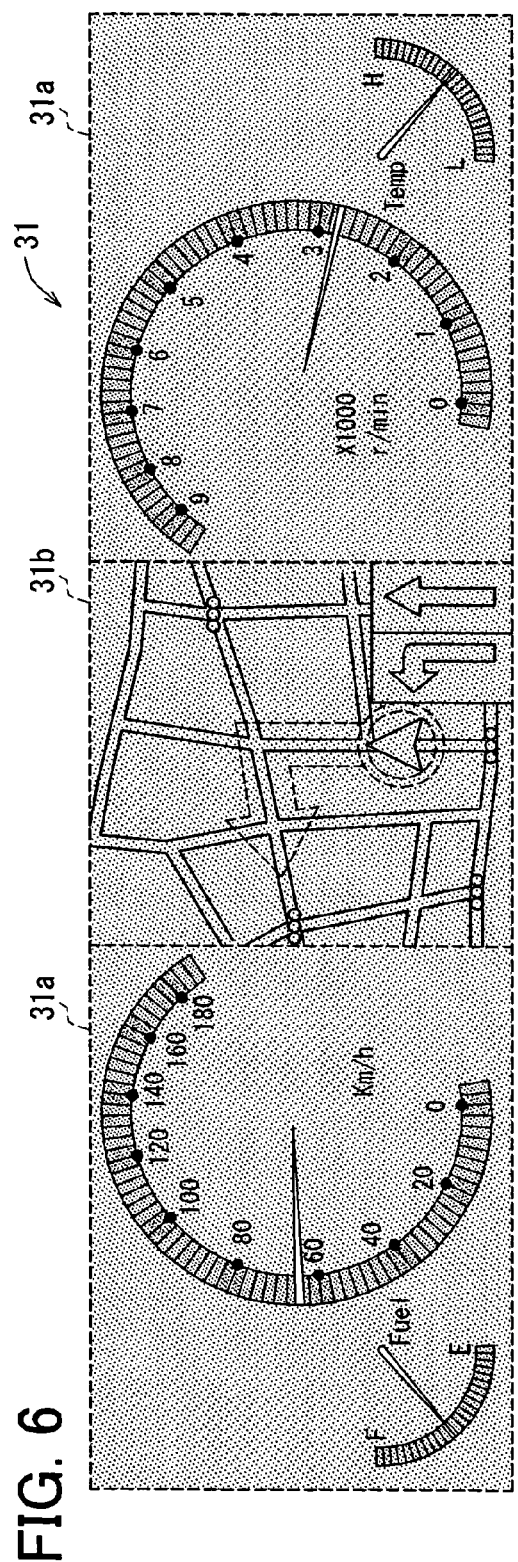

In this case, as shown in FIG. 6, not only the navigation display area 31b, but also the right and left meter display areas 31a are changed to corresponding colors for night (specifically, for example, brightness, color saturation, etc. are reduced) through the color changing processing.

As a result, the user is not affected by the image displayed in the meter display area 31a (for example, glare or the like), and thus the visibility of the map can be enhanced. Furthermore, as described above, the color information of the meter display area 31a corresponding to various color patterns, such as the color when a map is displayed in the navigation display area 31b (map color), the color when an intersection is displayed in a scale-up mode, etc., are registered in the color table. Therefore, the overall color balance of the display unit 31 can be kept at all times. Therefore, necessary information can be effectively transmitted to the user.

Figure 7:
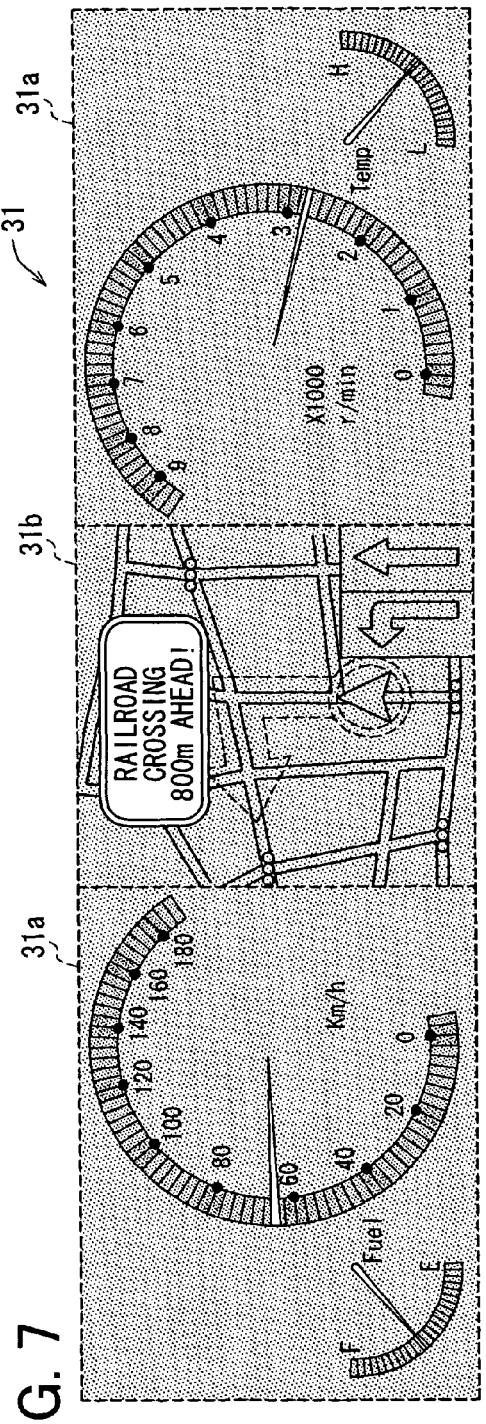
FIGS. 7 and 8 are front views showing aspects of color changed by the color changing processing.
Figure 8:
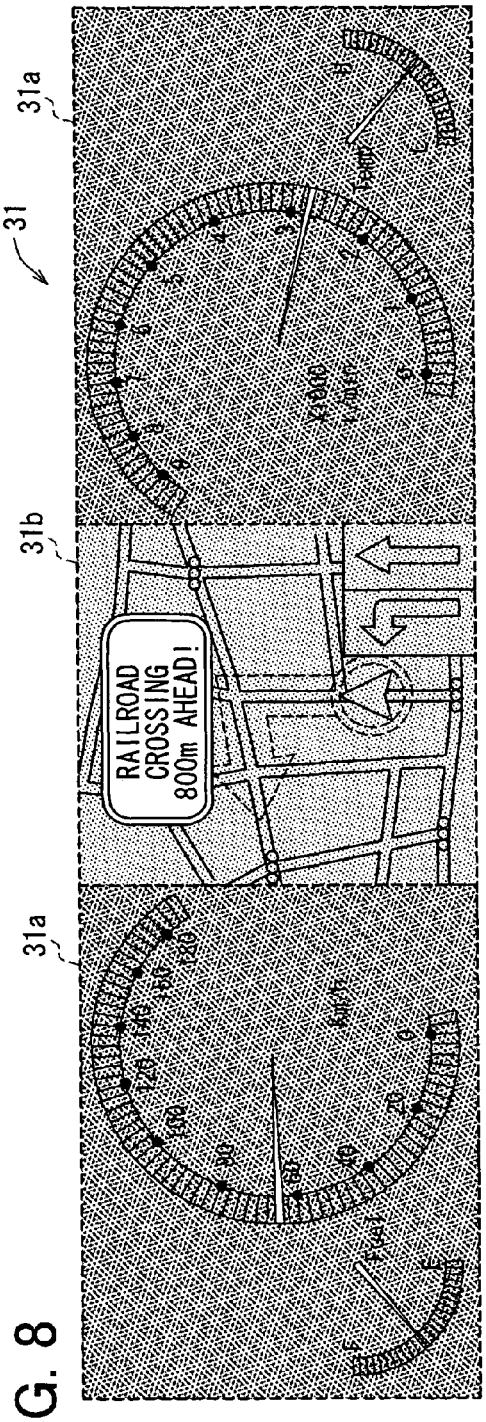
Figure 9:
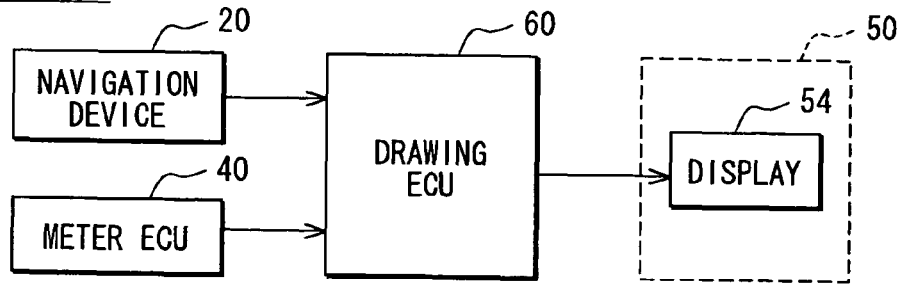
FIG. 9 is a block diagram showing a prior art display device.
Figure 10:
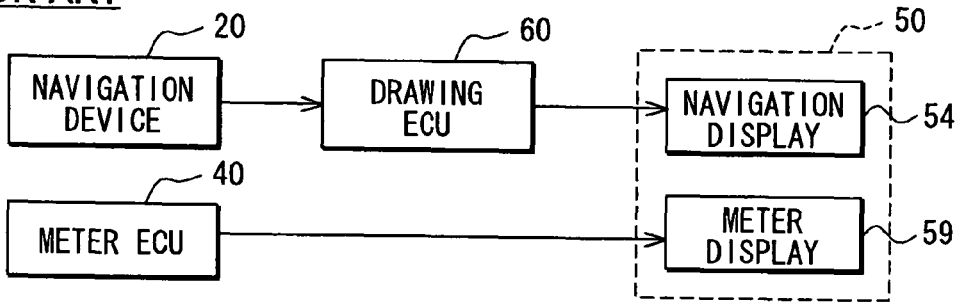
FIG. 10 is a block diagram showing another prior art display device.

Furthermore, in addition to the same construction and state as the display unit 31 shown in FIG. 6, the display unit 31 shown in FIG. 7 displays a warning "please pay attention to railroad crossing 800 m ahead!" on the map of the navigation display area 31b in a pop-up style. When the warning pops up, the color of the meter display area 31a is changed to corresponding dark color through the color changing processing as in the display unit 31 of FIG. 8. As a result, the navigation display area 31b and a warning message of the navigation display area 31b are eye-catching and thus the content of the warning is easily transmitted to the user.

When the user presses the steering wheel switch 34, the changed color is returned to the original one. Therefore, for example when the steering wheel switch 34 is pressed under the state of the display unit 31 shown in FIG. 8, the color is returned to the state of the display unit 31 shown in FIG. 7.

Accordingly, when the user recognizes the warning and presses the steering wheel switch 34, the color is returned to the original one and thus the overall color of the display unit 31 is kept balanced.

Second Embodiment

Figure 11:
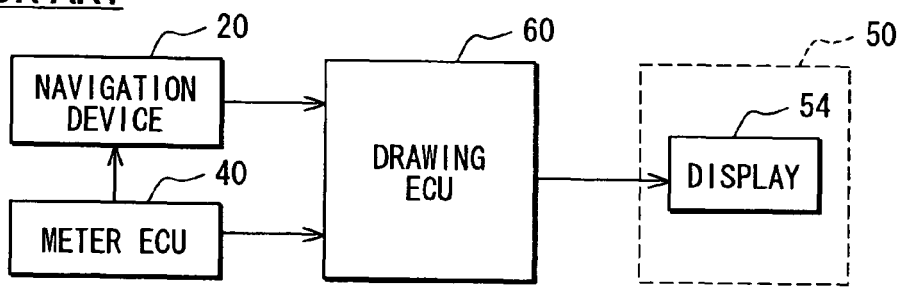
FIG. 11 is a block diagram showing a display device for a vehicle according to a second embodiment of the present invention.
Figure 12:
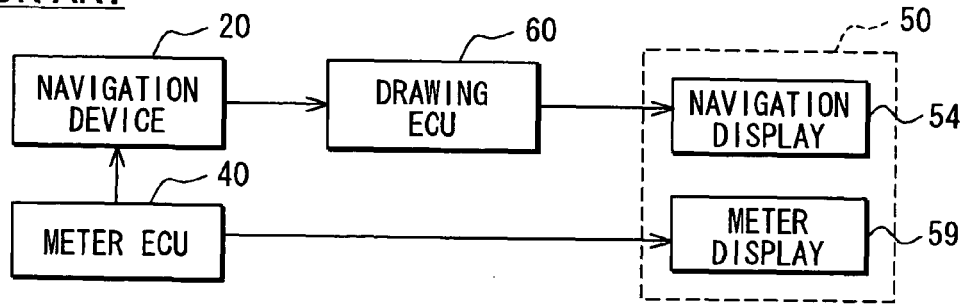
FIG. 12 is a block diagram showing another display device.

A display device for a vehicle shown in FIGS. 11 and 12 is constructed with a meter ECU 40, a meter 50, a drawing ECU 60 and a navigation device (hereinafter referred to as navigation device) 20. The meter ECU 40, the drawing ECU 60 and the navigation device 20 are connected to one another by an in-vehicle LAN (Local Area Network). Data may be transmitted by a dedicated cable without passing through the in-vehicle LAN in accordance with the content of the data.

Figure 13:
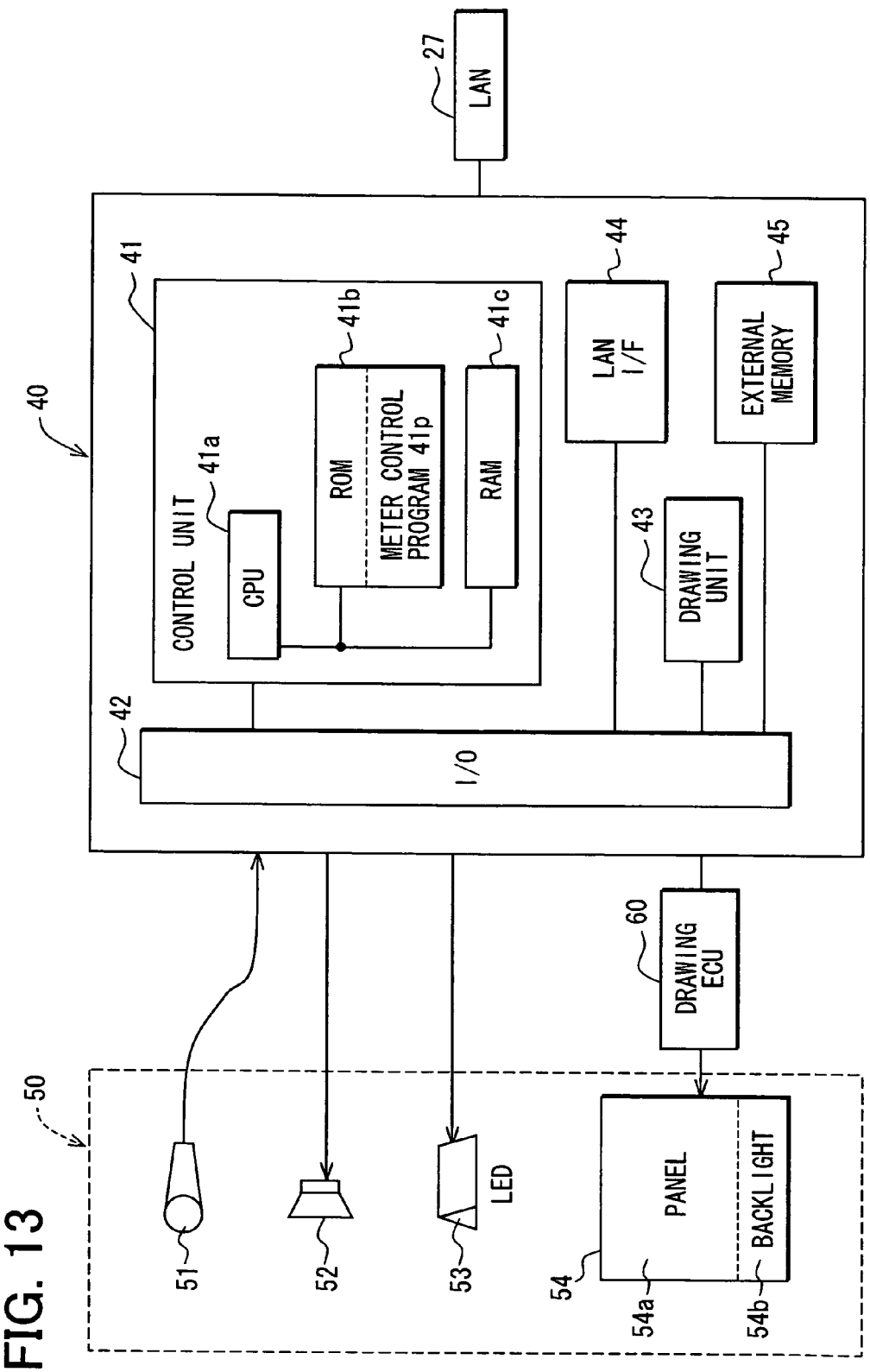
FIG. 13 is a block diagram showing a meter ECU and a meter.

FIG. 11 shows the construction containing a meter display area and a navigation display area in a display unit 54 of a meter 50, and FIG. 13 is a block diagram showing the construction of the meter ECU 40 and the meter 50 in the construction shown in FIG. 11. The meter ECU 40 is constructed with a control unit 41, and a drawing unit 43, a LAN I/F 44 and an external memory 45 which are connected to the control unit 41 through an I/O 42 serving as an input/output circuit.

The control unit 41 as a meter control unit is constructed with a CPU 41a, a ROM 41b, a RAM 41 and peripheral circuits such as an A/D conversion circuit, etc. (not shown). IN the ROM 41b are stored a meter control program 41p for executing various kinds of processing executed in the meter ECU 40 and data.

The drawing unit 43 creates meter display data to be displayed on the display unit 54 on the basis of data which are received from an in-vehicle LAN 27, etc. and necessary for meter display, and data for display and data for display colors are stored in the drawing unit 43. The data to be retrieved are information on the temperature of water for an engine, the number of revolutions of the engine, the vehicle speed, the shift position, the travel distance, the date and hour, the residual fuel amount, etc.

The LAN I/F 44 is an interface circuit for communicating data with the in-vehicle LAN 27.

The external memory 45 is constructed with EEPROM (Electrically Erasable & Programmable Read Only Memory), a rewritable semiconductor memory such as a flash memory or the like, and information required to operate the meter ECU 40 and data are stored in the external memory 45. The external memory 45 keeps the storage content even when the meter ECU 40 is turned off.

The meter 50 is constructed with a microphone 51, a speaker 52, a LED 53 and a display unit 54, and displays meter display data from the drawing ECU 60.

The microphone 51 is used as a part of a voice input device of the navigation device 20, for example. Voice data input from the microphone 51 may be directly transmitted to the navigation device 20 without passing through the in-vehicle LAN 27.

Figure 14:
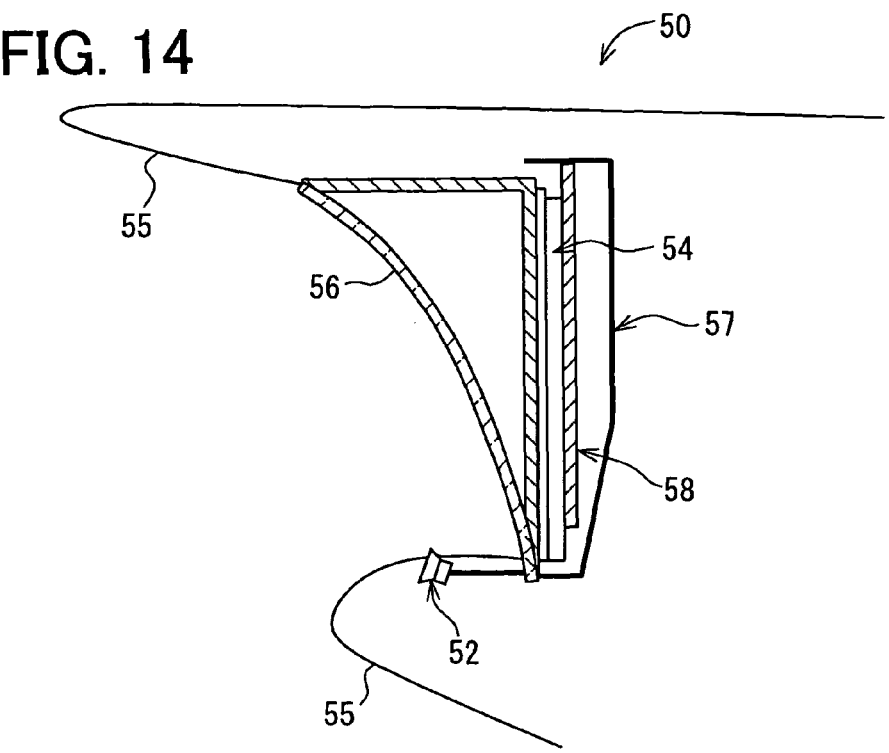
FIG. 14 is a cross-sectional view of the meter.

The speaker 52 transmits a voice message from various kinds of in-vehicle equipment. It also transmits a voice message of the navigation device 20. The speaker 52 and the navigation device 20 may be directly connected to each other not through the in-vehicle LAN 27. In the example of FIG. 14, the speaker 52 is secured in a meter hood 55 in the neighborhood of the meter.

The LED 53 is mainly used for irregularly-displayed lighting elements such as a direction indicating light, an operation monitor light, a warning light, etc.

The display unit 54 is constructed with a panel 54a such as a well-known color liquid panel, a backlight 54b and a driver circuit (not shown) for controlling liquid crystal display. The driver circuit is designed as an active matrix driving type which includes transistors at respective pixels and turns on or off a target pixel, and it makes a display on the basis of a drawing instruction and drawing data transmitted from the meter ECU 40. An organic EL (Electroluminescence) display unit or a plasma display unit may be used as the display unit 54.

In the constructions of FIGS. 11 and 13, the meter display data created in the drawing unit 43 are transmitted to the drawing ECU 60, and combined with the meter display navigation data transmitted from the navigation device 20 in the ECU 60 to create meter display data, and the meter display data thus created are displayed on the display unit 54.

FIG. 12 shows another example of the construction in which the display unit 54 for displaying only navigation data is contained in the meter 50. The construction of the display unit 54 is the same as the construction shown in FIG. 11. In this construction, however, the meter ECU 40 is not connected to the drawing ECU 60, and it contains a driving control unit (not shown) for controlling the driving of a meter display unit 59 as a mechanical meter containing a stepper motor for moving the meter indicating pointer and, LED, a meter character board, a meter indicating pointer, etc. in place of the drawing unit 43. The driving control unit controls the driving of the meter display area 59 (the driving of the stepper motor, turn-on of LED) on the basis of the data necessary for the meter display received from the in-vehicle LAN 27, etc.

In the construction shown in FIG. 12, the meter display navigation data transmitted from the navigation device 20 through the drawing ECU 60 are displayed on the display unit 54. In the meter display area, the inside of the meter or a predetermined area of the meter is illuminated by LED, a light or the like contained in the meter display unit 59. The colors of these illuminations, the color of the meter panel and the meter indicating pointer, the color and design of meter characters, etc. are contained in meter information.

FIG. 14 is a cross-sectional view showing the meter 50. A meter board 58 containing the display unit 54, the driver circuit, etc., LED 53 (not shown), the meter display unit 59 (not shown), etc. are accommodated in a case 57, and the case is secured to a predetermined position of a dash panel. A meter food 55 covers the upper and lower side of the case 57 to mainly suppress light reflection and mirror, thereby enhancing the visibility of the meter 50. Furthermore, a dust-proof transmissible member 56 is secured to the front surface of the display unit 54.

Figure 15:
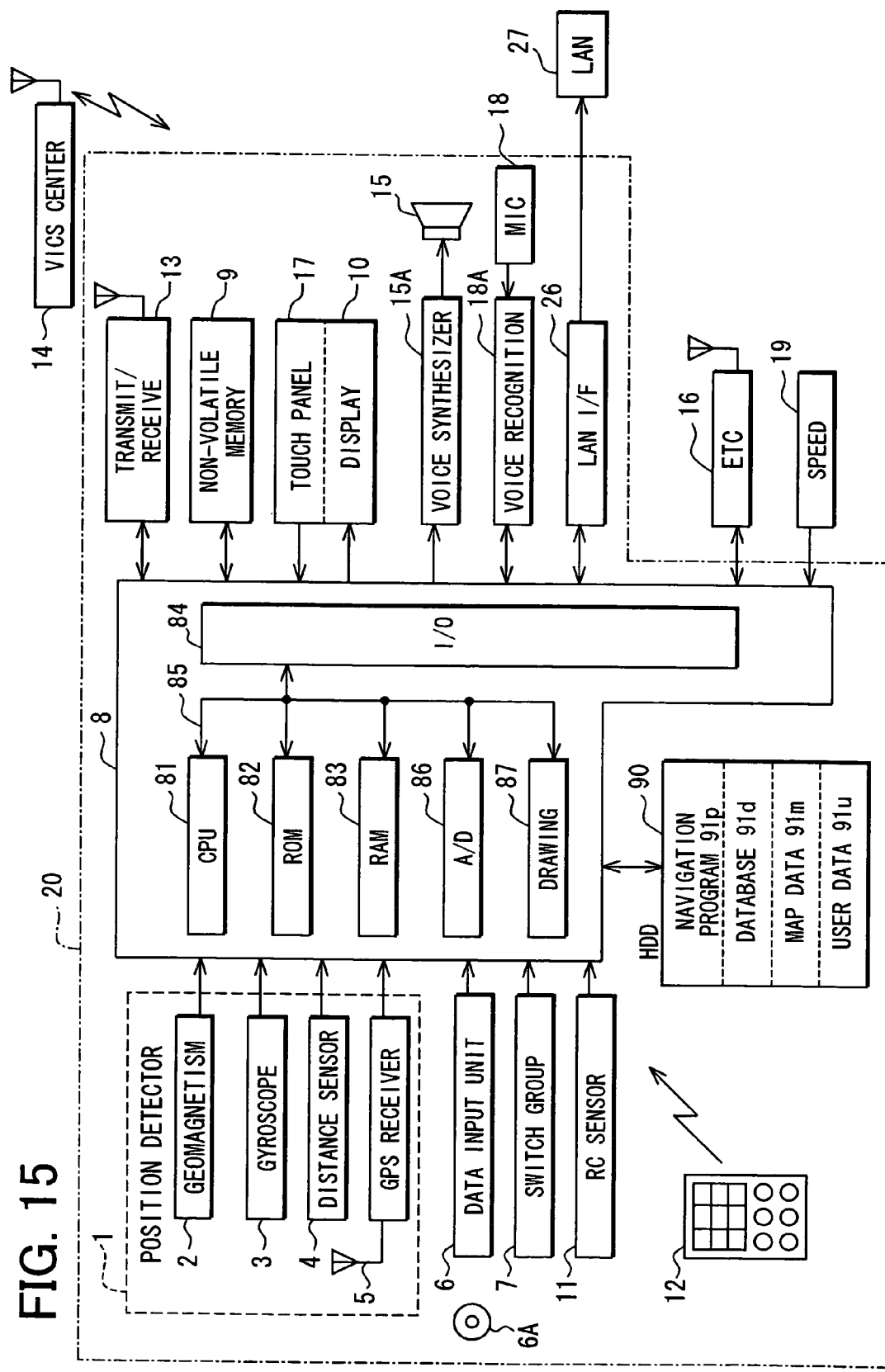
FIG. 15 is a block diagram showing a navigation device.

FIG. 15 is a block diagram showing the construction of the navigation device 20. The navigation device 20 is equipped with a position detector 1, a map data input unit 6, an operating switch group 7, a remote control sensor 11, a voice synthesizing circuit 15A and a speaker 15 for carrying out voice guidance, etc., a non-volatile memory 9, a display unit 10, a hard disk device (HDD) 90, a control unit 8 connected to the above elements, and a remote controller 12.

The position detector 1 has a geomagnetic sensor 2, a gyroscope 3, a distance sensor 4 and a GPS receiver 5 for detecting the position of the vehicle on the basis of radio waves from satellites. These sensors, etc. 2, 3, 4 and 5 have respective errors which are different in property, and thus they are used while supplemented by plural sensors. The position detector 1 may be constructed with some of the above sensors in accordance with the precision, and further a rotational sensor of a steering, a wheel sensor of each rolling wheel, for example a vehicle speed sensor 23 or the like may be used.

A touch panel 17 integrated with the display unit 10 or mechanical switches are used as the operating switch group 7. In the touch panel 17, an electrical circuit is wired in the X-axis direction and the Y-axis direction on the screen of the display unit 10 so as to be spaced from a glass board and transparent film through a gap called as a spacer. When a user touches the film, the wires at the pressed portion are short-circuited and thus the voltage value is varied. This variation of the voltage value is detected as a two-dimensional coordinate (X, Y). This is a resistance film type and it is broadly used. In place of the mechanical switches, a pointing device such as a mouse, a cursor may be used.

Various kinds of instructions may be input by using a microphone 18 and a voice recognizing unit 18A. A voice signal input from the microphone 18 is processed by a voice recognition technique such as a well-known hidden Markov model or the like in the voice recognition unit 18A, and converted to the operation command corresponding to the processing result. Various instructions can be input by the operating switch group 7, the remote control terminal 12 and the microphone 18. The microphone 51 of the meter 50 may be used.

A transmitter/receiver 13 is for receiving road traffic information from VICS (Vehicle Information Communication System) center 14.

By communicating with ETC (Electronic Toll Collection) in-vehicle unit 16, toll information, etc. received from an ETC on-road unit (not shown) by the ETC in-vehicle unit 16 can be taken into the navigation device 20. Furthermore, the ETC in-vehicle unit 16 may be connected to an external network to communicate with the VICS center 14 or the like.

The control unit 8 is normally constructed with computer, and it is equipped with a CPU 81, a ROM 82, a RAM 83, an I/O 84 as an input/output circuit and a bus line 85 for connecting these elements. The CPU 81 performs the control operation on the basis of a navigation program 91$p$ and data stored in HDD 90. The control of reading/writing of data from/into HDD 90 is executed by CPU 81. The A/D converter 86 contains a well-known A/D (analog/digital) conversion circuit, and for example, it can convert analog data input from the position detector 1 or the like to the control unit 8 to digital data which can be processed in CPU 81. A program for the required minimum operation out of the navigation function may be stored in ROM 82 for such a case that HDD 90 fails.

The drawing unit 87 creates navigation drawing data to be displayed on the display unit 10 from data for display and data for display colors stored in HDD 90 or the like, and meter display navigation data to be displayed in a navigation data display area 77 (FIG. 18 to FIG. 20) of the meter 50.

Map matching data to enhance the precision of the position detection and map data 91$m$ containing road data representing the connection of roads are stored in HDD 90 in addition to the navigation program 91$p$. The map data 91$m$ stores predetermined map image information for display and road network information containing link information, node information, etc. The link information is predetermined section information constituting each road, and it is constructed with the position coordinate, the distance, the required time, the road width, the number of lanes, the limited speed, etc. The node information defines intersections (branched roads), etc., and it is constructed with the position coordinate, the number of right/left turn lanes, the road link of connection destination, etc. Data indicating whether passage is possible or impossible, etc. are set in inter-link connection information.

Furthermore, the user can uniquely write data such as auxiliary information for route guidance, amusement information and other data in HDD 90, and stored as user data 91$u$. The contents of these user data 91$u$ can be rewritten by the operation of the operating switch group 7, the touch panel 17 and the remote control terminal 12 or a voice input from the microphone 31. Furthermore, data required for the operation of the navigation device and various kinds of information may be stored as data bases 91.

The map data 91$m$ and the user data 91$u$ can be added/renewed from the storage medium 6A through the map data input unit 6. A CD-ROM or DVD is generally used as the storage medium 6A from the viewpoint of the data amount, however, other media such as a memory card, etc. may be used, for example. Furthermore, the data may be downloaded from an information center such as an internet server through an external network.

The non-volatile memory 9 is constructed with EEPROM or a rewritable semiconductor memory such as a flash memory, and information and data required to operate the navigation device 20 are stored in the non-volatile memory 9. The non-volatile memory 9 is designed to keep its storage content even when an accessory switch of the vehicle is set to an off state, that is, the navigation device 20 is set to an off state. Furthermore, the information and the data required to operate the navigation device 20 may be stored in HDD 90 in place of the non-volatile memory 9. Furthermore, the information and the data required to operate the navigation device 20 may be shared to the non-volatile memory 9 and the HDD 90 and stored there.

The display unit 10 is constructed with a well-known color liquid crystal display. It contains a dot matrix LCD and a driver circuit (not shown) for controlling LCD display control. The diver circuit is designed as an active matrix driving type which can turn on or off a target pixel by providing a transistor every pixel, and it carries out the display operation on the basis of a display instruction and display frame data (navigation drawing data) transmitted from the control unit 8. Furthermore, an organic EL (ElectroLuminescence) display unit or a plasma display unit may be used as the display unit 10.

The speaker 15 is connected to a well-known voice synthesizing circuit 15A connected to the I/O 84, and transmits an analog voice to which the voice synthesizing circuit 15A converts digital voice data stored in the non-volatile memory 9 or HDD 90 on the basis of an instruction of the navigation program 91p. As a method of voice synthesis may be used a sound recording editing system of accumulating voice waveforms with no modification or while encoding the voice waveforms and connecting voice waveforms as occasion demands. Furthermore, the speaker 52 of the meter 50 may be used.

The vehicle speed sensor 19 contains a rotation detector such as a well-known rotary encoder, and it is disposed, for example, in the neighborhood of the wheel fixing portion to detect the rotation of the wheel and transmit the detection result as a pulse signal to the control unit 8. In the control unit 8, the number of revolutions of the wheel is converted to the speed of the vehicle to calculate a predicted arrival time needed from the present position of the vehicle to a desired place or calculate an average vehicle speed every travel section of the vehicle.

The LAN I/F 26 is an interface circuit for communicating data with the in-vehicle LAN 27. It receives meter information from the meter ECU and outputs navigation data for meter display to the drawing ECU 60. Furthermore, it may take data from the vehicle speed sensor 19 through LAN I/F 26 and connect to the ETC in-vehicle unit 16.

With the above construction, when the navigation program 91p is executed by the CPU 81 of the control unit 8, the navigation device 20 executes the following processing if the user selects the route guidance processing of displaying on the display unit 10 a destination route from a menu displayed on the display unit 10 by the operation of the operating switch group 7, the touch panel 17 or the remote control terminal 12 or the voice input from the microphone 18.

That is, when the user selects any spot on the map or selects a spot from facility search, address search or registered places set by the user and set the spot thus selected as a destination, the present position of the vehicle is determined by the position detector 1, and the processing of determining the optimum guide route from the present position to the destination is executed. The guide route is displayed while superposed on the road map on the display unit 10, thereby guiding the proper route to the user. A method such as the Dijkstra method is known as the method of automatically setting the optimum guide route. A guidance under the operation or a message corresponding to the operation state is made by at least one of the display unit 10 and the speaker 15.

Figure 16:
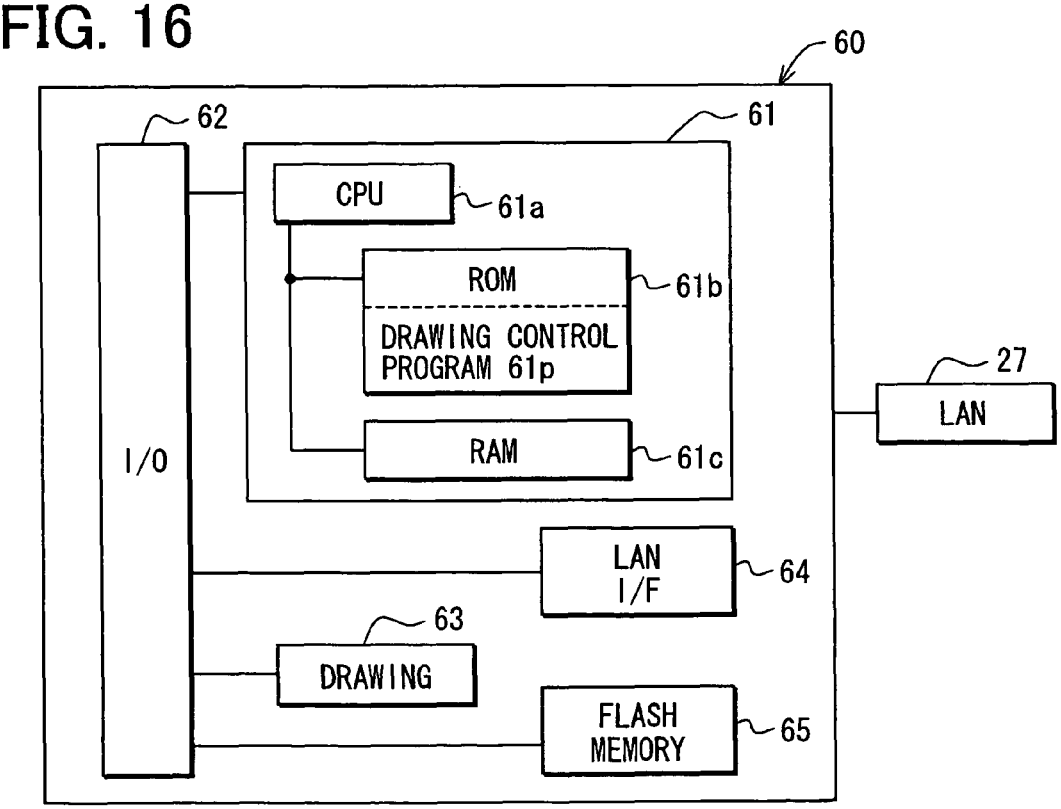
FIG. 16 is a block diagram showing a drawing ECU.

FIG. 16 is a block diagram showing the construction of the drawing ECU 60. The drawing ECU 60 is constructed with a control unit 61, and a drawing unit 63, a LAN I/F 64 and a flash memory 65 which are connected to the control unit 61 through I/O 62 as an input/output circuit.

The control unit 61 is constructed with a CPU 61a, a ROM 61b, a RAM 61c and peripheral circuits such as an A/D conversion circuit (not shown). A drawing control program 61p and data for executing various kinds of processing executed in the drawing ECU 60 are stored in ROM 61b. Data required to operate the drawing ECU 60 and data required to create meter display drawing data are stored in the flash memory 65.

The drawing unit 63 combines the meter drawing data received from the meter ECU 40 through the in-vehicle LAN 27 and the meter display navigation data received from the navigation device 20 by the drawing control program 61p to create the meter display drawing data, and transmits the meter display drawing data to the display unit 54. The display unit 54 displays the meter display drawing data transmitted from the drawing ECU 60.

Figure 17:
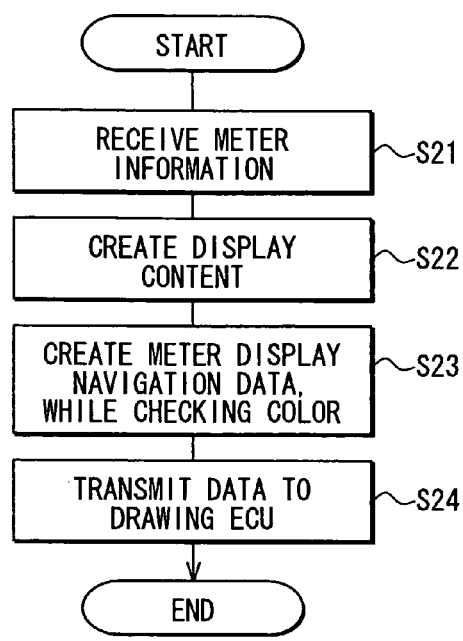
FIG. 17 is a flowchart showing drawing processing.

The processing of creating the meter display navigation data to be displayed in a navigation data display area 77 of the display unit 54 (FIGS. 18 to 20) will be described with reference to FIG. 17. This processing is contained in the navigation program 91p and repetitively executed together with other programs than the navigation program 91p.

First, meter information is received from the meter ECU 40 through the in-vehicle LAN 27 (S21). The meter information contains at least one of the following information pieces.

Figure 18:
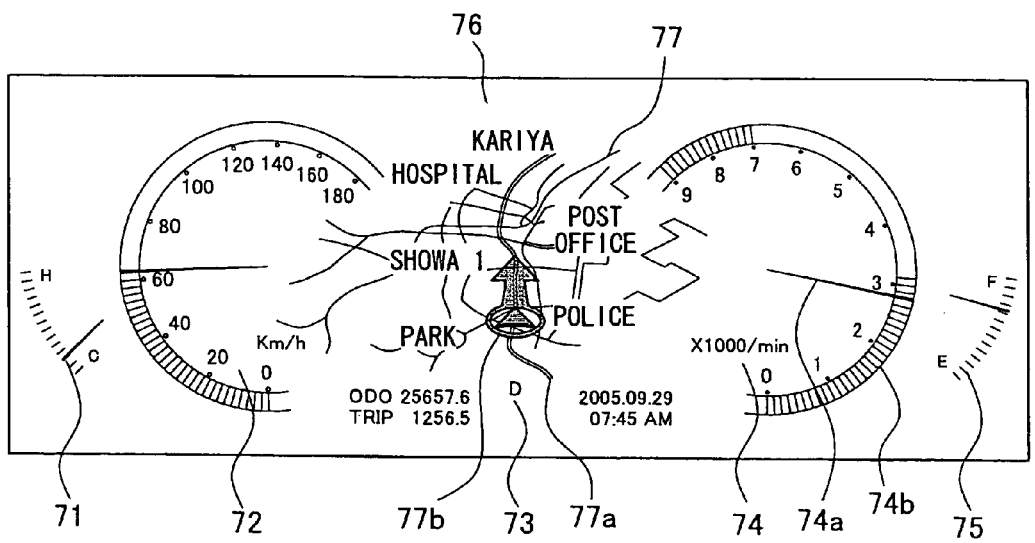
FIG. 18 is a front view showing a display example of the meter.
Figure 19:
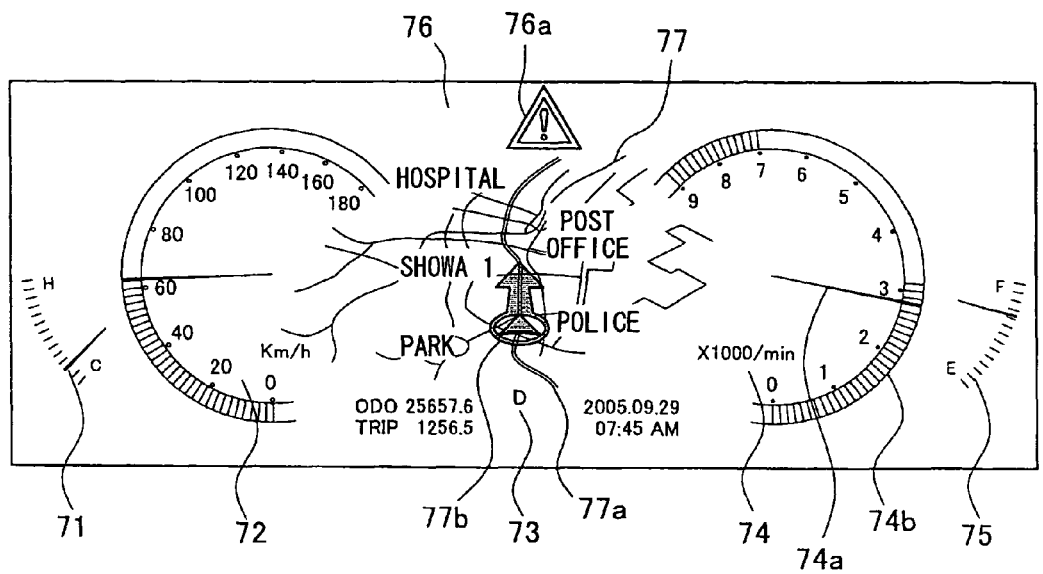
FIG. 19 is a front view showing a display example of the meter before a navigation data display color is changed.
Figure 20:
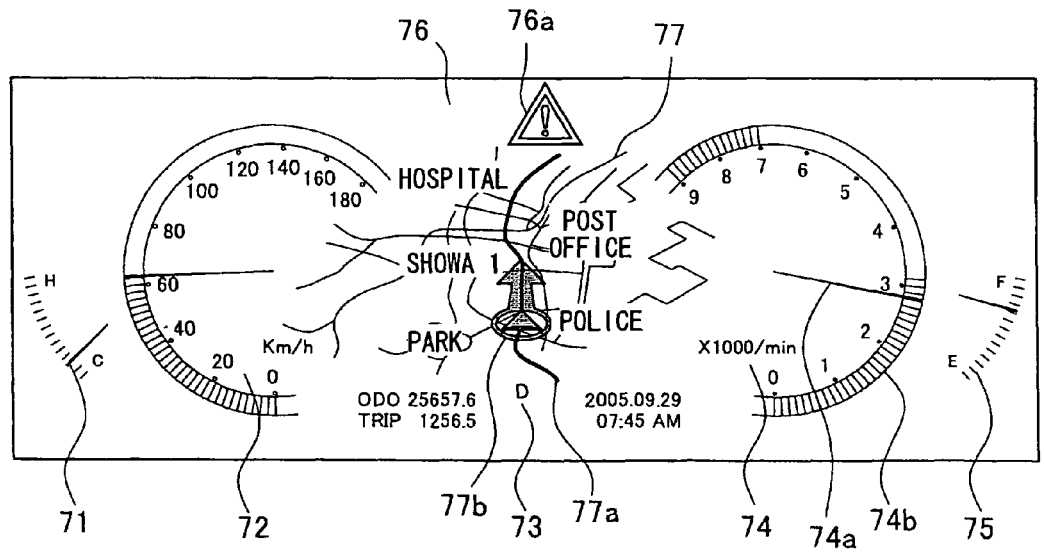
FIG. 20 is a front view showing a display example of the meter after the navigation data display color is changed.

(1) Display color information (background, indicating pointers, characters, etc.) of the meter display area (FIGS. 18 to 20).

(2) Character design information (the size of characters, typestyle, display color, font attribute, etc.) of the meter display area.

(3) Brightness information of the display of the meter display area.

(4) Information on the size of the navigation data display area 77 or the display position of the navigation data display area 77 on the display unit 54.

In the construction of FIG. 12, the inside of the meter or a predetermined area of the meter is illuminated by LED, a light or the like contained in the meter display unit 59. The color of the illumination, the colors of the meter panel and the meter indicating pointers, the color and design of meter characters, etc. are contained in the meter information. The meter information may be stored in the external memory 45.

Subsequently, the map information around the present position of the vehicle is received from the map data 91m on the basis of the vehicle present position detected by the position detector 1 or the like to determine the display content to be displayed on the display unit 10 of the navigation device 20, and the navigation drawing data corresponding to the display content are created (S22). It is needless to say that the display content may be a display frame when a menu frame/setting input frame is displayed by the operation of the user.

Meter display navigation data are created from navigation drawing data on the basis of the meter information thus retrieved (S23).

An example of the creation of the meter display navigation data in the construction shown in FIG. 12 will be described by using a display example on the display unit 54 of FIGS. 18 to 20. The display unit 54 of the meter 50 contains a water temperature display area 71 contained in the meter display area, a vehicle speed display area 72, a display area 73 for a range meter, a shift position, etc., an engine number-of-revolution display area 74, a fuel meter display area 75, a warning display area 76, a navigation data display area 77, etc. FIG. 18 shows a state that a map is displayed in the navigation data display area 77 and a guide route 77*a* and the vehicle present position/travel direction 77*b* are shown on the map to thereby perform route guidance.

When the meter ECU 40 detects some abnormality from a sensor or another in-vehicle equipment under the state of FIG. 18, a warning mark 76*a* is displayed in the warning display area 76 as shown in FIG. 19. At this time, when the display color of the warning mark 76*a* is the same color or the same color type as the display color of the guide route 77*a*, the warning mark 76*a* is difficult to be visually recognized. Therefore, it is checked whether the same color as the display color of the warning mark 76*a* contained in the meter information retrieved in the meter display navigation data creating processing is used in the navigation data display area 77. If it is determined that the same color is used in the display of the guide route 77*a*, for example, the display color of the guide route 77*a* is changed to another color as shown in FIG. 20, and then the meter display navigation are created and transmitted to the drawing ECU 60.

In addition to the above method, the following methods may be used as the method of creating the meter display navigation data from the navigation drawing data.

(1) The background color, character color and indicating pointer color information of the meter display area, which may be the water temperature display area 71, the vehicle speed display area 72, the display area 73 for the range meter, the shift position, etc., the engine number-of-revolution display area 74, the fuel meter display area 75, the warning display area 76, etc., are received from the meter ECU 40. For example, when the background color of the meter display area is changed from black to white and the color of the characters is changed from white to black, the background color of the navigation drawing data is also changed to a bright color such as white or cream color, and then the meter display navigation data are created. Furthermore, the character color of the navigation data is also matched with the character color of the meter display area, and further the display color of the guide route is also matched with the color of the meter indicating pointers.

(2) The character design information displayed in the meter display area is received from the meter ECU 40, and the character design used in the meter display navigation data is matched with that used in the meter display area.

(3) The brightness information of the meter display area is received from the meter ECU 40, and the meter display navigation data are created so that the brightness thereof is matched with or is not identical to the brightness of the retrieved brightness information. The brightness can be varied by adjusting color tone.

(4) The size of the navigation data display area 77 and the position information are received from the meter ECU 40, and the meter display navigation data are created with the reduction scale or display density corresponding to the above information. For example, the type of roads, the type of facilities, the number of character arrays, the size of characters to be displayed are varied in accordance with the size of the navigation data display area 77.

With respect to the roads, when the navigation data display area 77 is large, even narrow streets are displayed. However, when the navigation display area 77 is small, only main roads such as national roads, prefectural roads are displayed.

With respect to the facilities, when the navigation display area 77 is large, even small-scale facilities/stores are displayed. However, the navigation display area 77 is small, only main facilities such as stations, government and other public offices, large-scale commercial stores are displayed.

With respect to the number character arrays and the character size, when the navigation display area 77 is large, data are displayed with the normal character array number (for example, "Nagoya Station") and the normal character size. However, when the navigation display area 77 is small, data are displayed with a smaller character array number than the normal one (for example, "Na-station") and a smaller character size.

(5) When stop information at the stop time of the vehicle or a full screen request is received from the meter ECU 40, the overall meter display area is used as the navigation data display area 77 so that a detailed map can be displayed.

(6) Information on the thickness of scale markings displayed in the meter display area is received from the meter ECU 40, and the widths of the roads are determined in conformity with the thickness of the scale markings.

(7) Information of units (miles, kilometers, etc.) of the speedometer displayed in the vehicle speed display area 72 is received from the meter ECU 40, and the units used in the meter display navigation data are matched with the unit information.

After the meter display navigation data are created in the above processing, the meter display navigation data in an area having a predetermined range in which the navigation data display area 77 and the meter display area (for example, 72, 74) are adjacent to each other are processed in the navigation display area 77 on the basis of the meter information received from the meter ECU 40 so as to be matched with the display color of the adjacent meter display area every map data. As the processing method blurring, gradation, tone-down (brightness changing), etc may be used.

In the construction of FIG. 12, the meter display navigation data can be created as in the case of the construction of FIG. 11. the meter display navigation data in an area having a predetermined range in which the display unit 54 and the meter display unit 59 are adjacent to each other are processed so as to be matched with the display color of the meter display unit 59.

In the example of FIGS. 18 to 20, the shape of the navigation display area 77 is not limited to a rectangular shape which has been generally used, but it may be shaped so as to intrude into unused areas of the vehicle speed display area 72 and the engine number-of-revolution display area 74. With this construction, the display area of the panel 54*a* can be effectively used, and the navigation data display area 77 can be broadened. Furthermore, if the colors of navigation data such as maps, etc. displayed in the unused areas of the vehicle speed display area 72 and the engine number-of-revolution display area 74 are processed so as to be matched with the display colors of the respective display areas, there would occur no sense of discomfort in display.

In the example of the engine number-of-revolution display area 74 of FIG. 18, the navigation data display area 77 can be displayed with a scale-up mode so as to expand to the inside of the arrangement of the numerals of the scale 74*b* insofar as it is not overlapped with the meter indicating pointer 74*a*. When the meter indicating pointer 74*a* is moved from the position of FIG. 18 to the high rotational speed side, if the meter indicating pointer 74*a* approaches to the navigation data display area 77 as the indicating point moves, the navigation data display area 77 in a predetermined range of the approaching meter indicating pointer 74*a* is reduced and thus no map is displayed. Then, when the number of revolutions of the engine is reduced and thus the meter indicating pointer 74*a* returns to the position of FIG. 18, the navigation data display area 77 is expanded and a map is displayed as the meter indicating pointer 74a moves to the low rotational speed side.

The meter information received from the meter ECU 40 may contain a content of directly indicating brightness and color tone to the navigation device 20 in addition to the contents described above.

Returning to FIG. 17, the meter display navigation data thus created are transmitted to the drawing ECU 60 (S24).

The drawing ECU 60 combines the meter drawing data received from the meter ECU 40 and the meter display navigation data received from the navigation device 20 to create meter display drawing data, and transmits the meter display drawing data thus created to the meter 50. The meter 50 displays the meter display drawing data transmitted from the drawing ECU 60 on the display unit 54.

In the construction of FIG. 12, the drawing ECU 60 transmits the meter display navigation data received from the navigation device 20 as the meter display drawing data to the meter 50. The meter display navigation data may be further processed in the drawing ECU 60.

In the construction of FIG. 11, the drawing unit 87 of the navigation device 20 or the drawing unit 43 of the meter ECU 40 may be designed to contain the function of the drawing ECU 60. Likewise, in the construction of FIG. 12, the drawing unit 87 of the navigation device 20 may be designed to contain the function of the drawing ECU 60.

Third Embodiment

Figure 21:
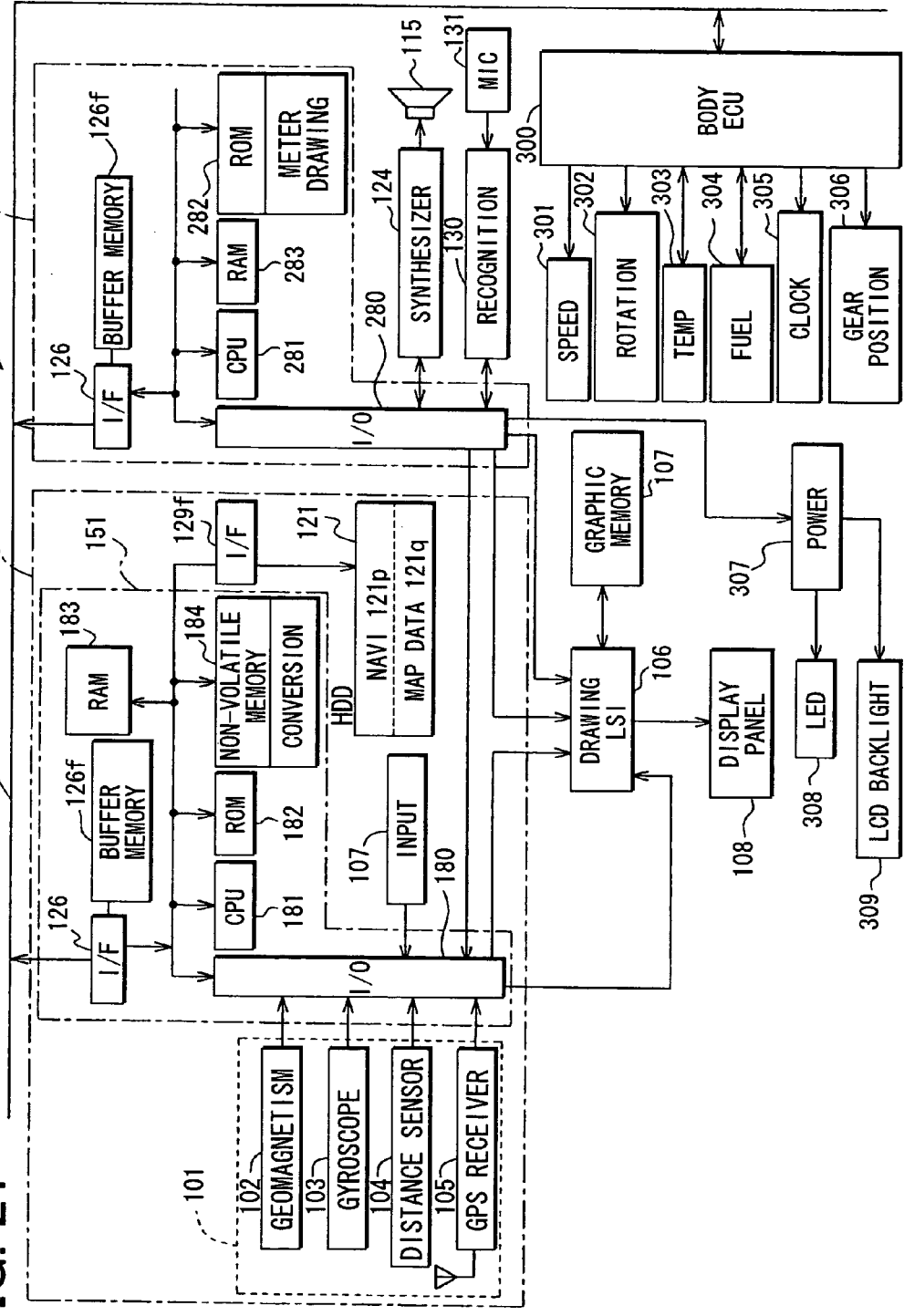
FIG. 21 is a block diagram showing a display device for a vehicle according to a third embodiment of the present invention.
Figure 27:
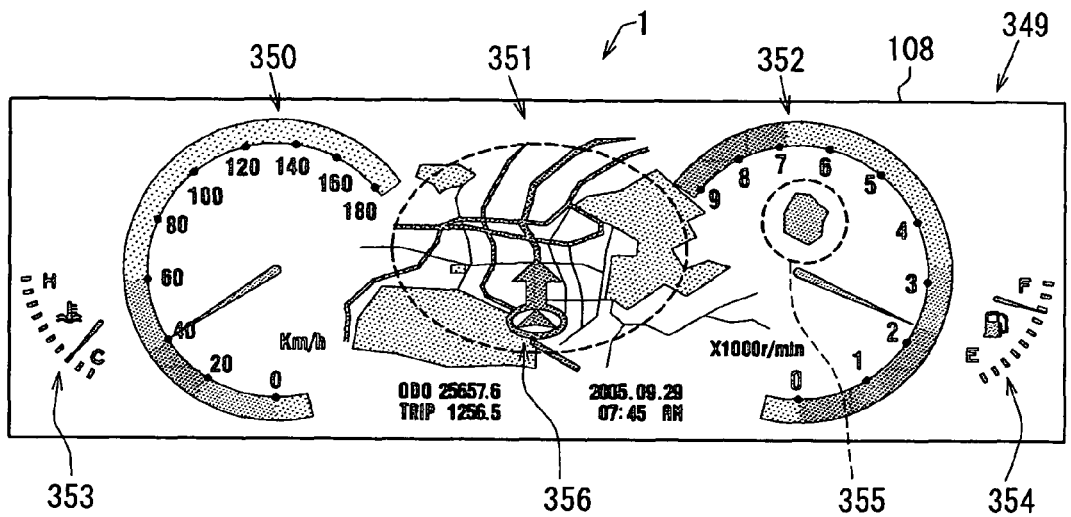
FIG. 27 is a front view showing a display example of the vehicle meter device in the third embodiment.

A meter device 1 shown in FIG. 21 is disposed so as to face the driver's seat of the vehicle. As shown in FIG. 27, it has a meter main area 349 and an auxiliary image display area 351 (an area surrounded by a white broken line: the meter main area 349 corresponds to the overall background portion of the area concerned). Although not colored in FIG. 27 and FIGS. 36 to 39, various parts are colored differently. Furthermore, the images are displayed while the gradation thereof is inverted in order to more clarify the contrast of each part of the image which has been subjected to the gray scale conversion.

The meter main area 349 includes meters 350, 352, 353 and 354 and an indicator 355 appended to the meters 350, 352, 353 and 354 which are arranged so as to be assembled with one another. The basic operation state information of the vehicle is visually displayed by the meters 350, 352, 353, 354 and the indicator 355. The indicator 355 corresponds to the emphasis display area. In this emphasis display area 355, the display state can be switched between the emphasized display state based on the predetermined emphasized display color and the non-emphasized display state from which the emphasized display state is released.

In this embodiment, when the non-emphasized display state is set, the display in the display area 355 is deleted by stop of the output of graphic data or transparency (setting the same color as the background containing the visible outline). Accordingly, only one emphasis display area 355 is shown in FIG. 27. However, plural emphasis display areas 355 are actually provided. Only the emphasis display area appearing in the drawing is set to the emphasized display state, and the other emphasis display areas are set to the non-emphasized display state and thus made transparent, so that these emphasis display areas do not appear on the drawing. The emphasis display area 355 under the non-emphasized display state may be displayed with a display color which is far away from the emphasis display color in color by a fixed color difference or more, so that the display is not canceled.

The auxiliary image display area 351 has a color pixel matrix for image display which is separated and compartmented from the meter main area 349, and color-displays an auxiliary image containing display information other than the basic operation state information. In FIG. 27, the auxiliary image is set as a route guidance image of the navigation device (navigation image).

Out of the graphic areas displayed in the pixel matrix of the auxiliary image display area 351, an area whose display color can be set to the pre-restriction set color having the same type as the emphasis display color when the display state of the emphasis display area 355 is under the display state is set as a restriction target monitor area 356. There is provided a display control unit having the function of the display color restriction converting unit for converting the display color of the restriction target monitor area 356 to the post-restriction set color having a larger color difference from the emphasis display color than the pre-restriction set color in connection with the switching operation of the emphasis display area 355 at the meter main area 349 side from the non-emphasized display state to the emphasized display state.

The emphasis display area 355 is a warning display area for setting the display state to the emphasized display state on the basis of warning activating information contained in the basis operation state information (warning display area 355). The type of the warning display area 355 is not limited to a specific one. However, various kinds of display areas such as the excessive number of revolutions (rotation speed) of the engine, an excessive travel speed, abnormality of water temperature, lack of fuel, non-fastening of seat belts, unlock of doors, half-shut, abnormality of oil can be displayed. The warning display area 355 of the seat belt non-fastening is set to a warning display state.

As the meters 350, 352, 353, 354 are displayed a speedometer 350, an engine number-of-revolution meter 352, a water temperature meter 353 and a fuel residual amount meter 354. Out of the warning display areas 355, the number of revolutions of the engine, the excessive travel speed, the water-temperature abnormality or lack of fuel may be emphasized by changing the tint of the meter instruction value or the like. In this case, some of the meters 350, 352, 353 and 354 may be diverted to the warning display area 355. With respect to warning information (seat belt non-fastening, unlock of doors, half-shut, oil abnormality, etc.) having no specific relationship with the instruction information of the meters 350, 352, 353 and 354, the warning display area 355 (provided separately from the meters 350, 352, 353, 354) may be settled as one of the indicators.

Figures 22, 24:
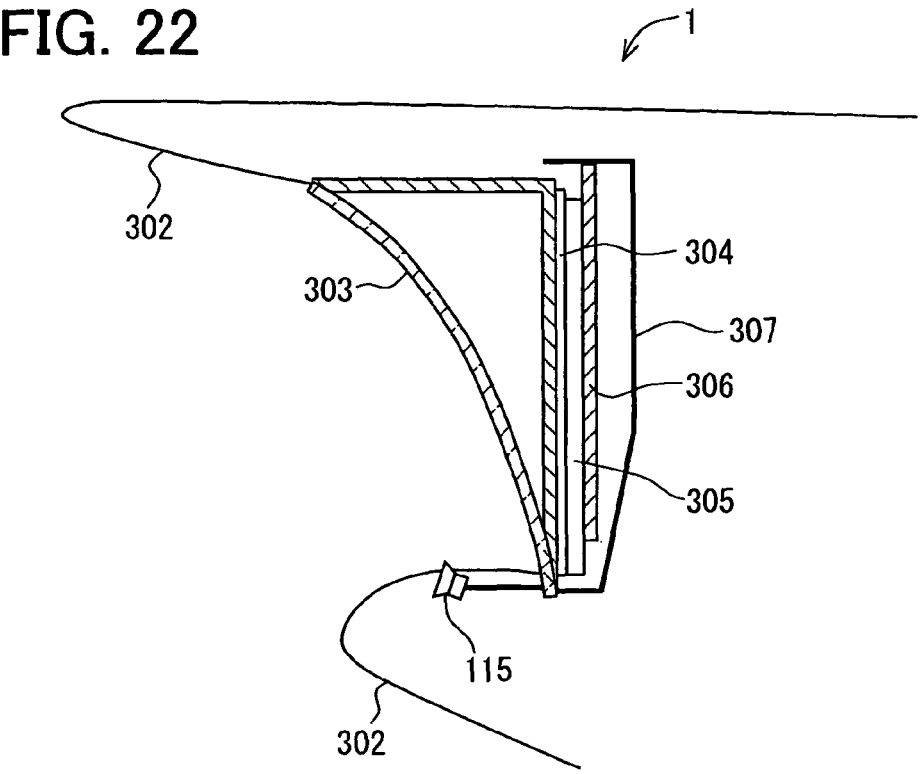
FIG. 22 is a cross-sectional view of a meter device.
FIG. 24 is a table showing an example of color set information of a monitor area (area to be monitored)

In this embodiment, as shown in FIG. 27, the meter main area 349 is displayed integrally with the auxiliary image display area 351 on the display panel having the color pixel matrix for image display. The emphasis display area 355 is set as the restriction origin monitor area (restriction origin monitor area 355) serving as a graphic area which is displayed on a display panel 108 (FIG. 21) with an emphasized display color together with the images of the meters 350, 352, 353 and 354. The display panel 108 may be constructed with a liquid crystal panel having a backlight, an EL display or the like. In this embodiment, the display panel 108 is constructed with a liquid crystal panel. FIG. 22 shows an example of the sectional structure of the liquid crystal panel concerned. A liquid crystal 304, a backlight (for example, LED type) 305 and a hardware substrate 306 are accommodated in a housing 307 while stacked in this order. A meter food 302 is provided to a portion of the instrument panel of the vehicle which faces the driver's seat. The housing 307 is mounted in a recess portion formed by the meter food 302. The liquid crystal panel 304 is located at the front side of the housing 307 which is visually recognized from the driver, and the front side of the liquid crystal panel 304 is covered by a cover lens 303. A speaker 115 is provided for voice guidance of the navigation device.

Referring again to FIG. 21, the display unit 1 has a meter drawing and creating unit 200 for retrieving, from the external, basic operation state information to be reflected to the display state of the meter main area and creating drawing data of the meter main area indicating the display state corresponding to the basic operation state information concerned, an auxiliary image drawing and creating unit 100 for creating color drawing data of an auxiliary image, and an image synthesizing and outputting controller (drawing LSI) 106 for combining the drawing data of the meter main area from the meter drawing and creating unit 200 and the drawing data of the auxiliary image from the auxiliary image drawing and creating unit 100 and displaying and outputting the meter main area 349 together with the auxiliary image on the display panel 108.

The meter drawing and creating unit 200 monitors the display color of the restriction origin monitor area 355 and transmits color restricting information to the auxiliary image drawing and creating unit 100 when the display set color of the restriction origin monitor area 355 is set to the emphasized display color. The auxiliary image drawing and creating unit 100 receives the color restriction information, searches the restriction target monitor area 356 in the auxiliary image and also executes the processing required to convert the display color of the restriction target monitor area 356 from the pre-restriction set color to the post-restriction set color.

In the above construction, the processing of creating the drawing data of the meters 350, 352, 353 and 354 and the processing of creating the drawing data of the auxiliary image in FIG. 27 are executed in a task-sharing style. Both drawing data are combined in an image synthesizing and outputting control unit 106 and output as one image frame. Accordingly, the display control of the image of the meter main area 349 and the auxiliary image can be efficiently and smoothly carried out. Thus, screen freeze or lumbering display of motion pictures can be effectively prevented. Particularly when the auxiliary image is a navigation image needing a large processing load like this embodiment, the task-sharing as described above is effective. In this case, the restriction origin monitor area 355 exists at the meter main area 349 side, and thus the color restriction information containing the display color setting of the restriction origin monitor area 355, etc. is transmitted from the meter drawing and creating unit 200 of FIG. 21 to the auxiliary image drawing and creating unit 100, whereby the restricted content of the display color of the restriction target monitor area 356 (that is, the conversion content of the display color) can be quickly grasped at the auxiliary image drawing and creating unit 100 side, and thus the display color conversion of the restriction target monitor area 356 when the display state is shifted to the emphasized display state can be quickly executed.

The auxiliary image drawing and creating unit 100 has an information system ECU 151 for performing the main control of the navigation device. The ECU 151 comprises a microcomputer including a CPU 181, a ROM 182, a RAM 183, a non-volatile memory 184 comprising EEPROM or a flash memory, and an input/output unit 180. Those are connected to one another through a bus. A storage device 121 comprising a hard disk drive is connected to the information system ECU 151 through a bus interface 129f. A navigation software 121p for implementing the basic function of the navigation device containing the drawing operation and map data 121q are stored in the storage device 121. The map data contain not only graphic data for drawing maps, but also road data, etc. required for various kinds of processing such as map matching, route search, route guidance, intersection data comprising detailed data of intersections, background data for background layer, place name data for displaying place names, etc., road appellation data including appellations of roads which are arranged according to the Japanese syllabary, for example.

Furthermore, a position detector 101 and an operation input unit 107 are connected to the input/output unit 180. The position detector 101 comprises a geomagnetic sensor 102 for detecting the absolute azimuth, a gyro scope 103 for detecting the yaw rate acting on the vehicle, a distance sensor 104 for detecting the travel distance of the vehicle and a GPS receiver 105 for receiving signals from artificial satellites for GPS (Global Positioning System). The position detector 101 calculates the present position of the vehicle in which the navigation device 100 is mounted.

By starting the navigation software 121p, the CPU 181 implements a well-known navigation function with the RAM 183 functioning as a work memory. That is, the user uses the operation input unit 107 to indicate a departure point and a destination point. Accordingly, the route search operation is carried out by referring to the map data 121q, and the guidance processing is started along the route thus searched. The present position of the vehicle is detected by the position detector 101, and graphic data for map drawing containing the detected position at the center are read out from road data, etc. and the map data to create drawing data of a navigation image (hereinafter referred to as navigation drawing data). The present position of the vehicle varies with the travel of the vehicle, and the navigation drawing data is renewed/created as needed in accordance with a new present position.

Next, the meter drawing and creating unit 200 is constructed as a meter ECU 200 for performing the main control of the meter display, and the main area thereof comprises a microcomputer including a CPU 281, a ROM 282, a RAM 283 and an input/output unit 280 are connected to one another through an internal bus. A meter drawing software is stored in the ROM 282.

The meter ECU 200 establishes a network connection to each of other ECUs such as the information system ECU 151 and a body system ECU 300 through each communication interface 126 by a serial communication bus 127. Reference numeral 126f represents a communication buffer memory for temporarily storing transmission/reception data. The body system ECU 300 is connected to a sensor (or switch) group for achieving basic operation state information to be displayed in the meters 350, 352, 353, 354 and the indicator 355. Specifically, the sensor (switch) group contains a vehicle speed sensor, an engine rotation (number-of-revolution) sensor 302, a water temperature sensor 303 of cooling water, a fuel residual amount sensor 304, etc. A calendar clock 305 for achieving the present date and hour, a gear position detector 306, etc. are connected to the body system ECU 300.

Furthermore, in the body system ECU 300, information on the water temperature monitor result, reduction of the residual fuel amount, seat belt non-fastening, door unlock, half-shut, oil abnormality or the like is received from each sensor or the switch group on the vehicle to check whether the vehicle is under a warning-required state or not, or retrieve through the communication a determination result which has been retrieved by another ECU. If the vehicle is under the warning-required state, the warning activating information is transmitted to the meter ECU 200 through the communication in association with the type of the indicator.

The meter ECU 200 achieves the basic operation state information from the sensor group 301 to 304 through the communication bus 127, and reflects the indication value onto the master image, for example, stored in ROM 282, of the corresponding meter, and creates the drawing data of each meter (meter drawing data). Specifically, the detection value of the vehicle speed sensor 301 is reflected to the speed meter 350, the detection value of the engine number-of-revolution sensor 302 is reflected to the engine number-of-revolution meter 352, the detection value of the water temperature sensor 303 is reflected to the water temperature meter 352, and the detection value of the fuel residual amount sensor 304 is reflected to the fuel residual amount meter 354. Furthermore, the warning activating information is also received to create the drawing data of the corresponding indicator and also set the display color of the emphasized display state.

Each of the navigation drawing data and the meter drawing data comprises visible outline information specifying the visible outline of a drawing graphic (for example, vector data for the outline) and color specifying information for specifying paint color of the drawing graphic concerned. FIG. 24 is a table showing the concept of the color specifying information, and the color specifying information and the specifying information of an area (graphic) to be displayed are associated with each other in the table. In this table, the color specifying information defines a display color to be set in the area by using hue, color saturation (chroma) and brightness. However, other attributes may be used to specify the display color. Only two of the variables indicating the three attributes of color are independent, and thus the display color may be defined by using only the attributes serving as the independent variables. Furthermore, there is also provided a graph indicating whether each area is a monitor area for color restriction, that is, the restriction origin monitor area 355 at the meter drawing data side and the restriction target monitor area 356 at the navigation drawing data. Here, "O" represents that the area is a monitor area, and "X" represents that the area is not a monitor area.

Next, the image synthesizing and outputting control unit 106 is constructed as a well-known drawing LSI. It receives drawing data and color indicating data from the auxiliary image drawing and creating unit 100 and the meter drawing and creating unit 200 to synthesize an image on a graphic memory 107. Furthermore, the image synthesizing and outputting control unit 106 determines a color output set value of each pixel of the display panel 108 on the basis of the drawing data and the color indicating data of each area and outputs the color output set value thus determined to the display panel 108. Accordingly, the image of the meter main area 349 and the navigation image 351 are output to the display panel 108 while integrated with each other as shown in FIG. 27.

Furthermore, the auxiliary image drawing and creating unit 100 and the meter drawing and creating unit 200 makes direct communications between the ports of the input/output units 180 and 280. When the emphasis display area 355 under the emphasized display state, that is, the restriction origin monitor area 355 exists at the meter drawing and creating unit 200 side, the color restriction information containing the color information of the restriction origin monitor area 355 is transmitted to the auxiliary image drawing and creating unit 100 side. The auxiliary image drawing and creating unit 100 receives this information to search a drawing area in which the pre-restriction set color is within a fixed color difference range with respect to the color information contained in the color restriction information, and specifies this drawing area as the restriction target monitor area 356. Furthermore, the auxiliary image drawing and creating unit 100 converts the pre-restriction set color to the post-restriction set color and delivers it to the image synthesizing and outputting control unit 106. Accordingly, the restriction target monitor area 356 is displayed with the post-restriction set color.

Figure 23:
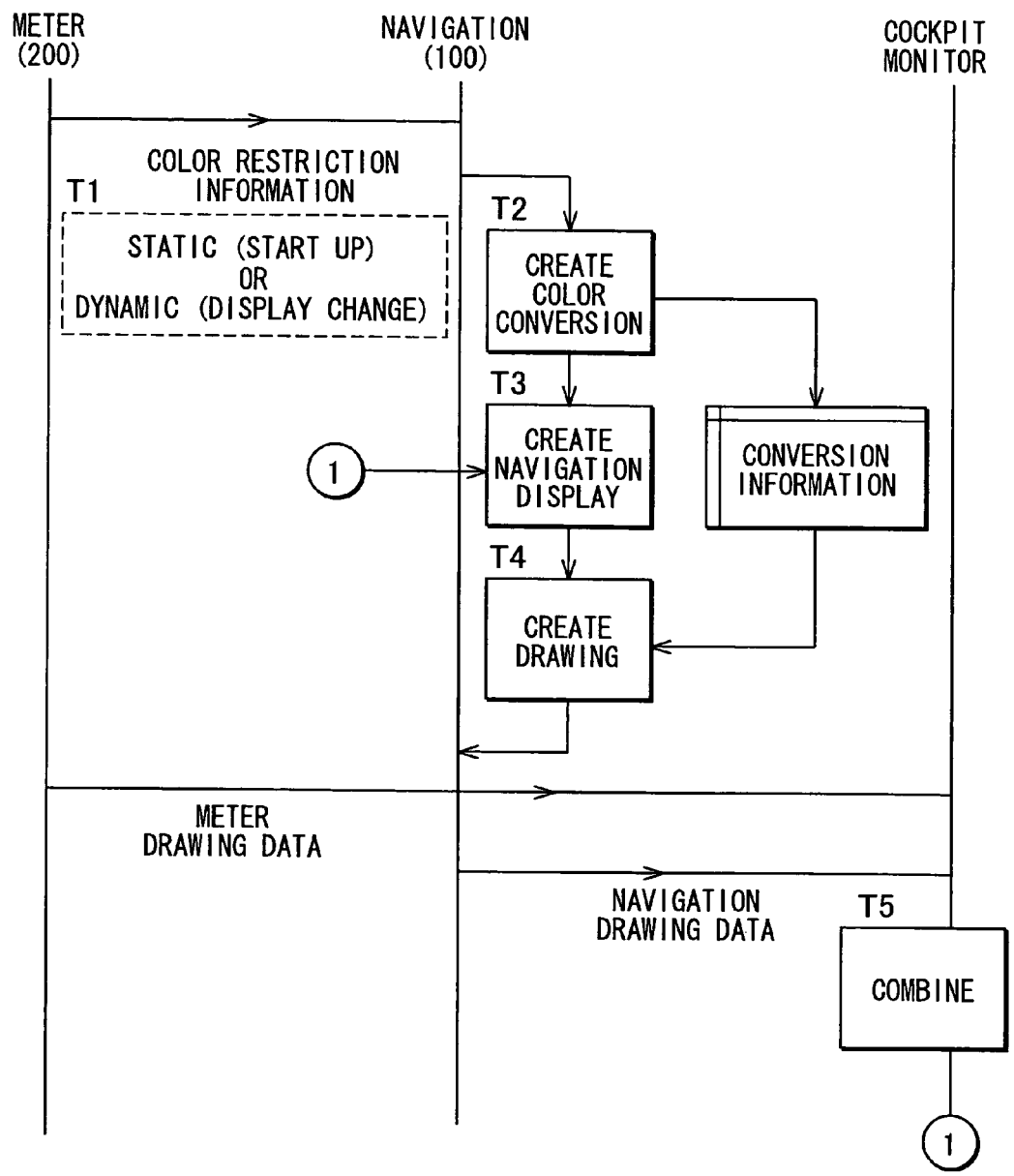
FIG. 23 is a flowchart showing processing of the vehicle meter device in the third embodiment.

FIG. 23 is a flowchart showing the overall processing. At T1, the color restriction information is delivered from the meter drawing and creating unit 200 to the auxiliary image drawing and creating unit 100 (navigation device), and at T2, conversion information to the post-restriction set color is created. At T3, the drawing data of the navigation image is created, and at T4, the navigation drawing data containing the color indicating information is created on the basis of the conversion information created at T2. At T5, the navigation drawing data and the meter drawing data are combined with each other.

Figure 25:
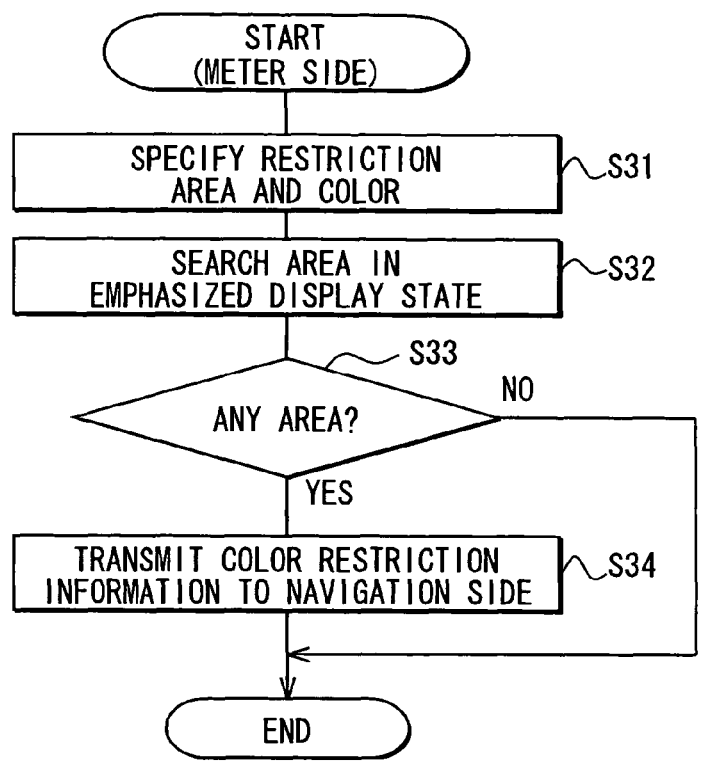
FIG. 25 is a flowchart showing color restriction processing attained at a meter side.

FIG. 25 shows an example of the processing in the meter drawing and creating unit 200. In S31, the meter drawing and creating unit 200 refers to the information shown in FIG. 24 to specify the restriction origin monitor area 355 and also the restriction target color thereof (that is, the set display color under the emphasized display state of the indicator 355 of FIG. 27: for example, red (hue 5b)). In S32, a restriction origin monitor area 355 under the emphasized display state is searched out of the restriction origin monitor areas 355. If such a restriction origin monitor area 355 as described above is searched in S33, the processing proceeds to S34, and transmits the color restriction information containing the color set information to the auxiliary image drawing and creating unit 100. If no restriction origin monitor area 355 under the emphasized display state is searched, S34 is skipped.

Figure 26:
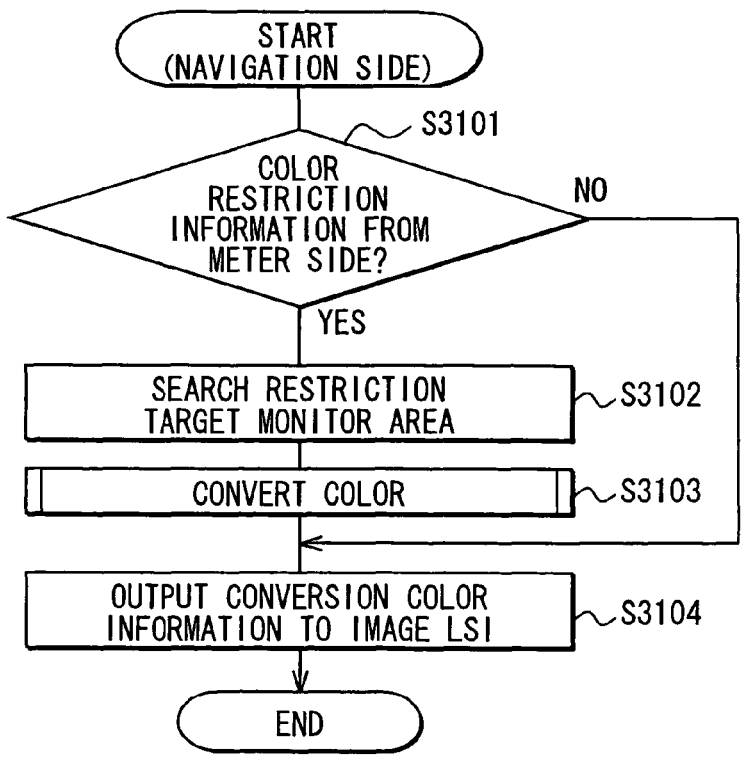
FIG. 26 is a flowchart showing color restriction processing at a navigation side.

FIG. 26 shows the processing at the auxiliary image drawing and creating unit 100 (navigation device) side. If it is determined in S3101 that the color restriction information is received from the meter drawing and creating unit 200, the processing proceeds to S3102. The area in which the color difference between the color set information of each area on the navigation image and the color set information of the restriction origin monitor area 355 is within a predetermined range is searched and specified as the restriction target monitor area 355. The color conversion processing is executed in S3103, and the color set information after the conversion is transmitted to the image synthesizing and outputting control unit 106 (image LSI) in S3104.

Figure 28:
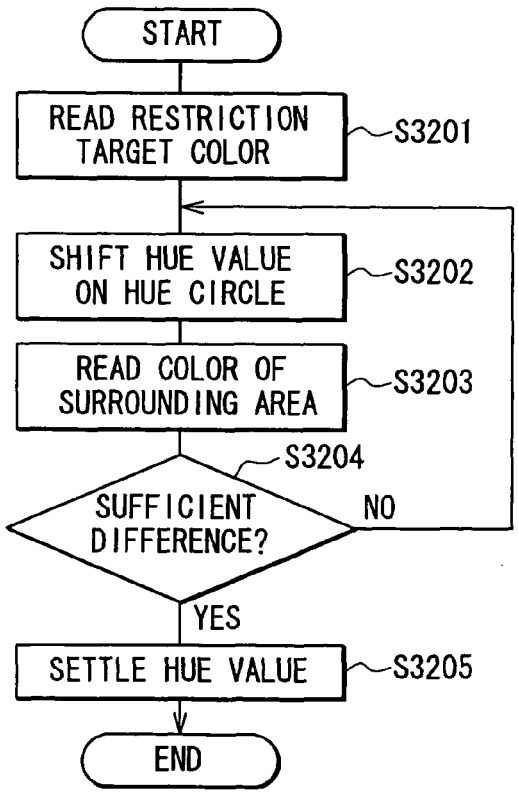
FIG. 28 is a flowchart showing a first example of color conversion processing.
Figure 30:
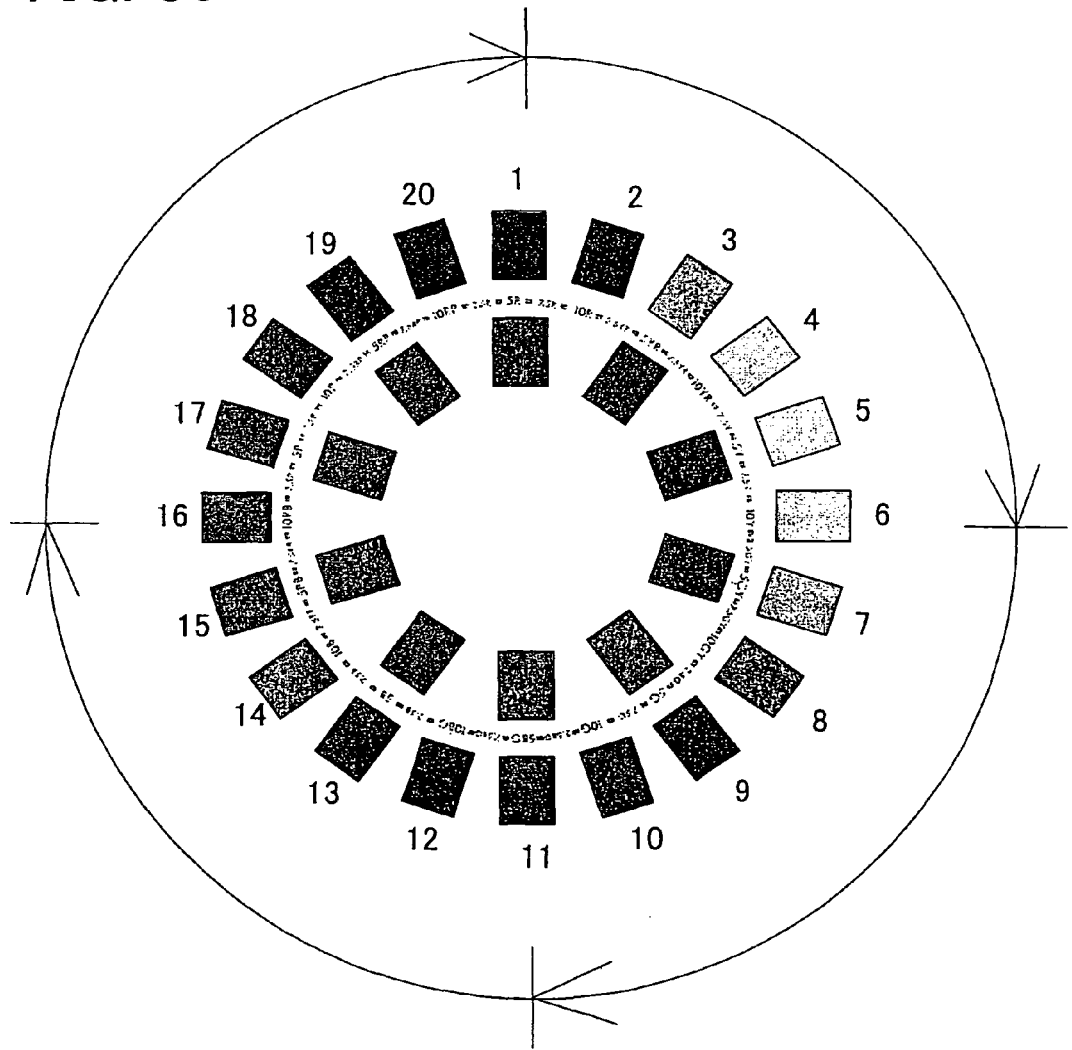
FIG. 30 is a conceptual diagram showing hue conversion.

With respect to the color conversion processing, various kinds of algorithms can be adopted. Some of the algorithms will be described hereunder with reference to flowcharts. FIG. 28 shows an example in which only the hue of the pre-restriction set color is changed. In S3201, the set value of the hue of the set display color (restriction target color) of the restriction target monitor area 356 is read out. In S3202, the hue set value is shifted by a fixed section on the hue circle shown in FIG. 30, and the hue value after the shift is read out as the hue value after the conversion. In S3203, the hue value of the set display color for the surrounding area which surrounds the restriction target monitor area 356 is also taken out. When this value is close to the hue value after the conversion, the color tone of the restriction target monitor area 356 after the color conversion is buried in the surrounding area. Thus the identification of the restriction target monitor area 356 is difficult.

Therefore, both the hue values of the restriction target monitor area 356 and the surrounding area thereof are compared with each other in S3204, and if the difference between both the hue values is equal to a fixed value or more, the processing proceeds to S3205 to settle the hue value of the restriction target monitor area 356. On the other hand, if there is no sufficient difference, the processing returns to S3202 to further shift the hue value of the restriction target monitor area 356, and the above processing is repeated.

Figure 29:
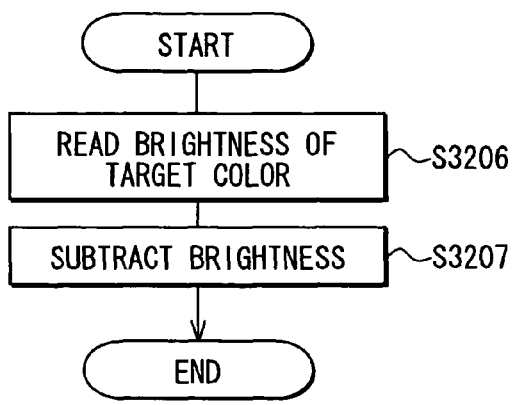
FIG. 29 is a flowchart showing a second example of the color conversion processing.

FIG. 29 is a flowchart showing the processing of subtracting the color saturation or brightness (only one or both of them may be subjected to subtraction processing) of the color set information of the restriction target color by a fixed level so that the display state of the emphasized display area 355 is relatively made conspicuous (S3206, S3207). This processing can be implemented by simple calculation processing on the color set information, so that there is an advantage that the processing load is small. As a more complicated calculation method may be used a method of setting three attribute values after conversion so that a fixed color difference is provided between the set color after the conversion and the display color of the emphasis display area 355 on predetermined chromaticity space. In the case of only the condition that the color difference is constant, infinite conversion colors indicated by coordinate points on the circumference spaced from the chromaticity coordinate point of the restriction target color exist on the uniform color space. Thus a direction determining condition of the color difference vector in the color space may be set so that a fixed difference in hue is provided, for example.

FIG. 33 shows the conceptual diagram of the calculation. The restriction target color is set as a prescribed area containing the chromaticity coordinate point of the set color of the emphasis display area. In the case of an individual area, it is a circle area having a radius of "r" from the chromaticity coordinate point at the center, however, it is not limited to this area. A coordinate point located to be spaced from the coordinate point of the restriction target color (FIG. 33 shows a case where the coordinate point of the restriction target color is coincident with the chromaticity coordinate point (that is, the center point of the circle) of the set color of the emphasis display area) in a fixed color difference vector direction by a distance R (that is, the color difference) is determined as the coordinate point of the set color after the conversion. For example, with respect to the red type restriction target color, the color difference vector direction is preferably set so as to direct to the blue type or green type area. The color space to be adopted may be general XYZ display system. However, it is more desirable to use the uniform color space (for example, L*a*b* display system).

As a simpler color conversion processing, the association relationship between the set color before conversion and the set color after conversion may be stored as a table as shown in FIG. 31. The processing of this method is shown in FIG. 32. According to this processing, the set value of the restriction target color is searched on the table of FIG. 31 in S3208, and the set value of the corresponding conversion color is read out and determined as a converted color set value in S3209. When the set value of the restriction target color is located at the intermediate position between adjacent set values on the table, the set value of the conversion color may be calculated by interpolation.

Furthermore, as shown in FIG. 34 there may be used a method of preparing for a table indicating the association relationship between the specific information of the restriction target monitor area 355 and the conversion color. In this case, the flow of the processing is shown in FIG. 35. The conversion color of the searched restriction target monitor area is searched on the table of FIG. 34 in S3211, and the set value of the corresponding conversion color is read out and determined as the color set value after conversion in S3209.

Figure 37:
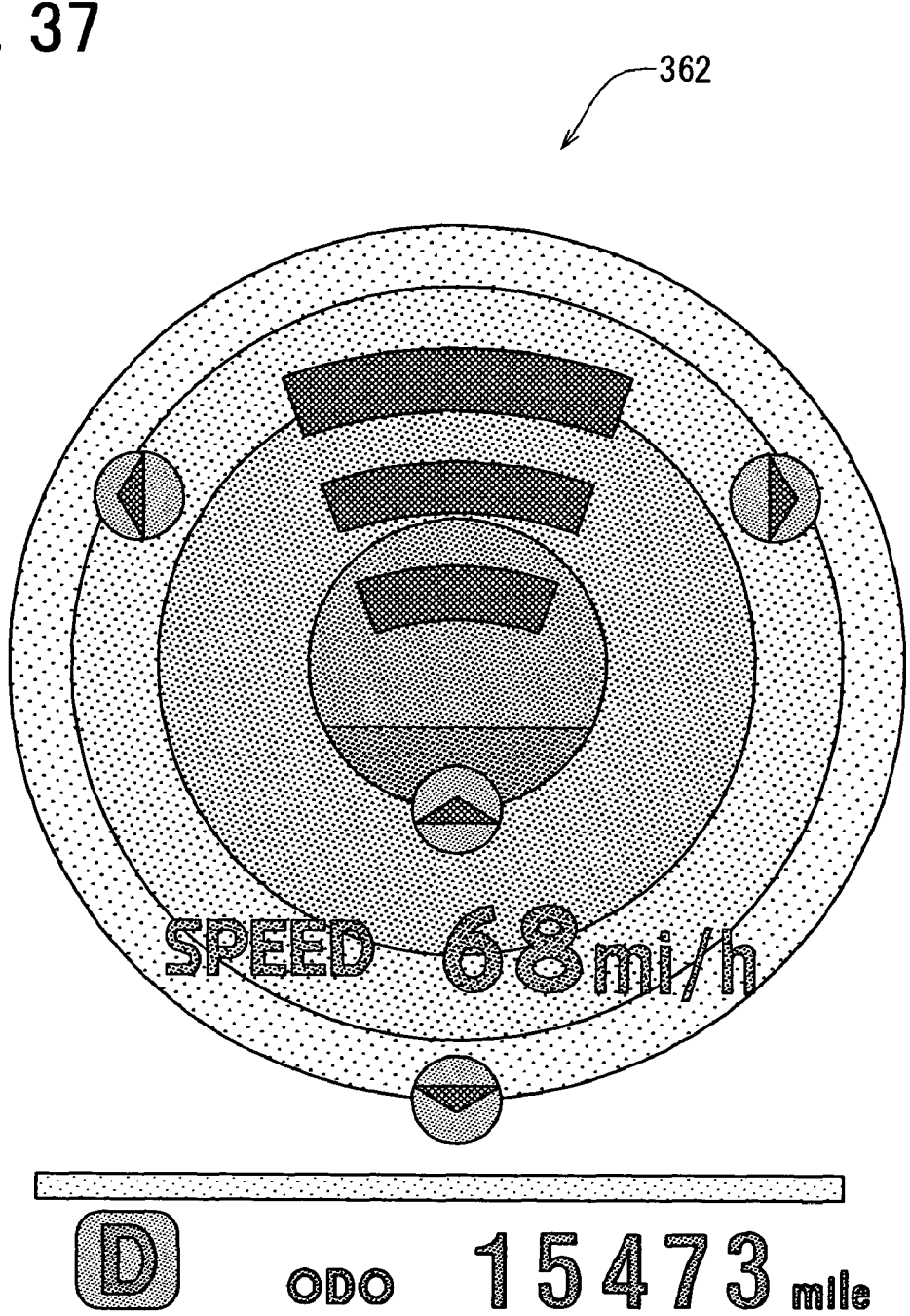
FIG. 37 is an enlarged view showing a second modification of the auxiliary image.
Figure 38:
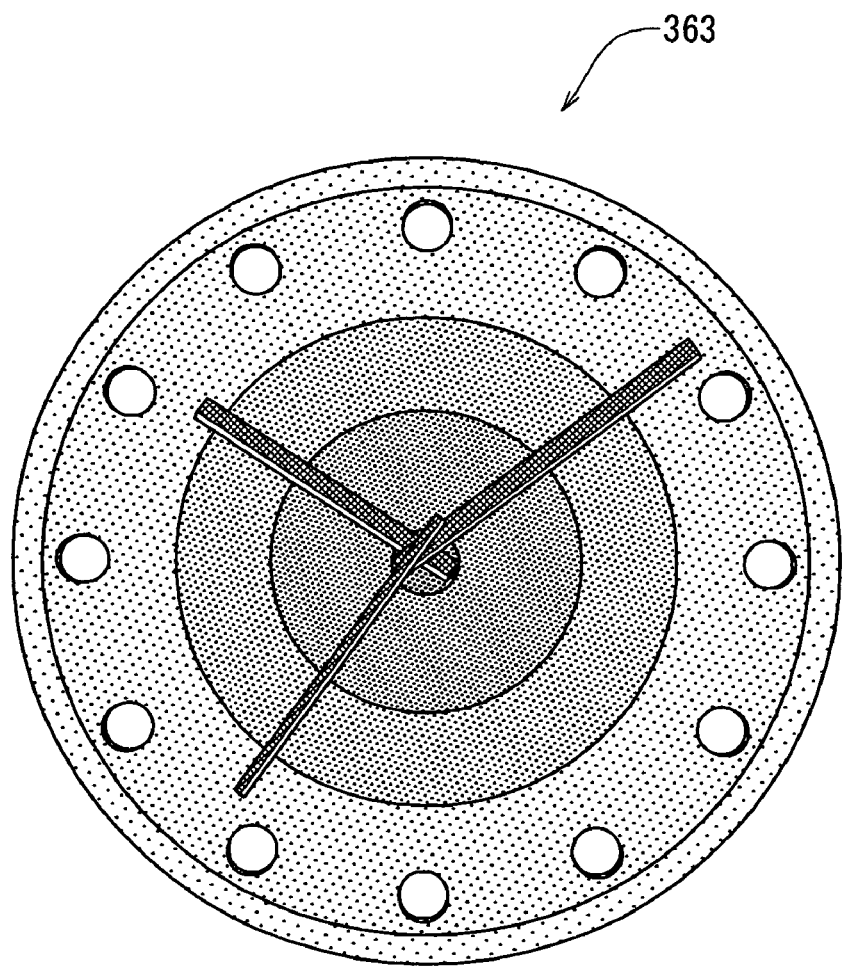
FIG. 38 is an enlarged view showing a third modification of the auxiliary image.
Figure 39:
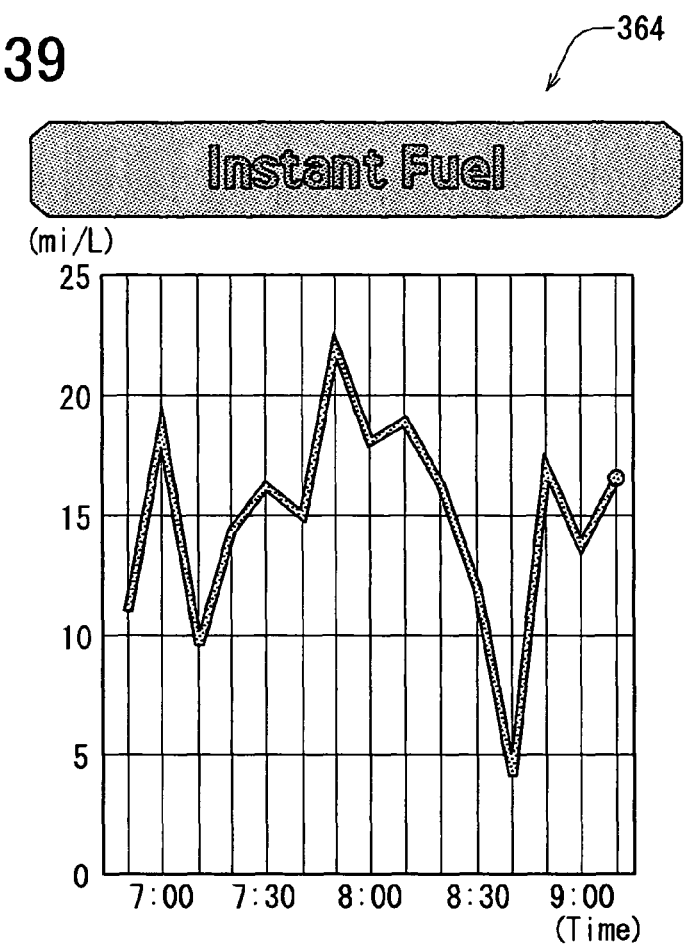
FIG. 39 is an enlarged view showing a fourth modification of the auxiliary image.

In the third embodiment, the auxiliary image is not limited to the navigation image. It may be set to a gear shift position image 361 as shown in FIG. 36, an auto-cruise display image 362 as shown in FIG. 37, a calendar clock 363 as shown in FIG. 38, an instantaneous fuel display image 364 as shown in FIG. 39 or the like. The display may be switched among these plural auxiliary images by a switching operation or the like.

Figure 40:
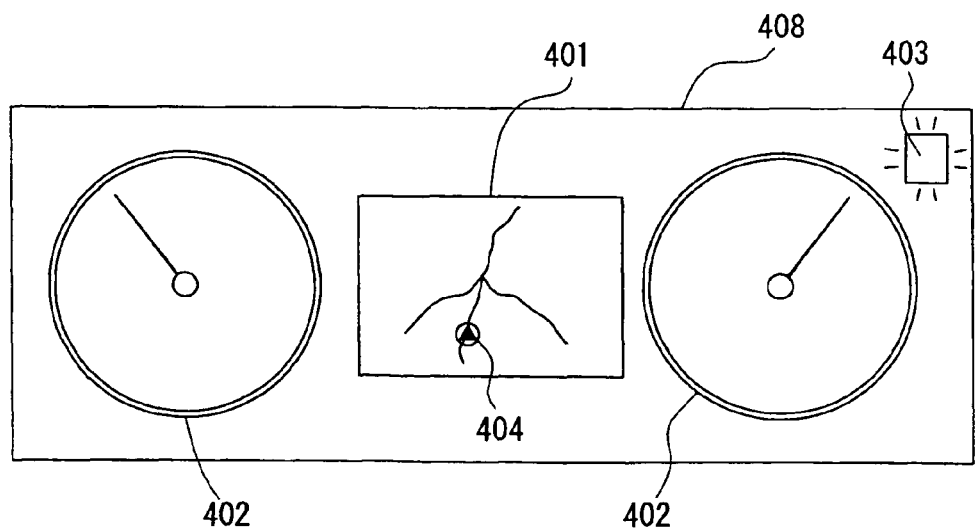
FIG. 40 is a front view showing a modification of the display device according to the third embodiment.

Furthermore, as shown in FIG. 40, in the meter main area 349, an analog mechanical type meter 402 fixed to a frame 408 may be used, and also a discrete type display light 403 based on LED or the like may be used as the emphasis display area 355 (the emphasized display state and the non-emphasized display state can be discriminated from each other on the basis of the difference of the lighting state (for example, turn-on and turn-off states). In this case, the auxiliary image display unit 401 may be secured to the frame 408 as the display panel 401 (for the navigation image display) independent of the meter main area 349. In this case, the display color of the display light 403 is grasped in advance, and on the basis of the display color of the display light 403, the color restriction processing of the restriction target monitor area 404 on the display panel 401 can be executed as in the case of the above method. In this case, no meter drawing and creating unit is necessary, and the auxiliary image drawing and creating unit 100 may achieve the information indicating the turn-on state from a turn-on controller of the display light 403 to execute the color restriction processing.

What is claimed is:

1. A display device for a vehicle comprising:
   a meter main area including meters and indicators appended to the meters, and having an emphasis display area, the meters and the indicators being arranged while assembled with one another so that basic operation state information of the vehicle is visually displayed by the meters and the indicators, and the emphasis display area being switchable between an emphasized display state based on a predetermined emphasis display color and a non-emphasized display state from which the emphasized display state is released;
   an auxiliary image display area that has a image displaying color pixel matrix separated and compartmented from the meter main area and color-displays an auxiliary image containing display information other than the basic operation state information; and
   a display control unit having a display color restriction converting unit for setting as a restriction target monitor area a graphic area which belongs to graphic areas displayed in the pixel matrix of the auxiliary image display area and whose display color is set to a pre-restriction set color of the same type as the emphasized display color when the display state of the emphasis display area is set to the non-emphasized display state, and converting the display color of the restriction target monitor area to a post-restriction set color having a larger color difference from the emphasized display color than the pre-restriction set color in connection with the switching of the emphasis display area at the meter main part side from the non-emphasized display state to the emphasized display state.

2. The display device according to claim 1, wherein:
   the emphasis display area is a warning display area whose display state is set to the emphasized display state on the basis of warning activating information contained in the basic operation state information.

3. The display device according to claim 2, wherein:
   the warning display area is set as one of the indicators.

4. The display device according to claim 3, wherein:
   hue of the emphasized display color set to the warning display area is set in a section passing from 10YR through 10R to 10P on a hue circle.

5. The display device according to claim 1, wherein:
the meter main area is displayed integrally with the auxiliary image display area on a display panel having a color pixel matrix for image display; and
the emphasized display area is set as a restriction origin monitor area corresponding to a graphic area displayed on the panel display together with the image of the meter with the emphasized display color.

6. The display device according to claim 5, wherein:
a display image of the meter does not include the emphasis display area.

7. The display device according to claim 1, wherein:
the auxiliary image is an output image of a navigation image.

8. The display device according to claim 7, wherein:
the output image includes a map image for route guidance of the navigation device; and
the restriction target monitor area is a graphic image of a present position pointer for indicating the present position of the vehicle on the map image.

9. The display device according to claim 5, wherein the display control unit comprises:
a meter drawing and creating unit for retrieving from an external device basic operation state information to be reflected to the display state of the meter main area, and creating drawing data of the meter main area indicating the display state corresponding to the basic operation state information;
an auxiliary image drawing and creating unit for creating color drawing data of the auxiliary image; and
an image synthesizing and outputting controller for combining the drawing data of the meter main area from the meter drawing and creating unit and the drawing data of the auxiliary image from the auxiliary image drawing and creating unit and displaying and outputting the meter main area on the display panel together with the auxiliary image,
wherein the meter drawing and creating unit monitors the display color of the restriction origin monitor area and transmits color restriction information to the auxiliary image drawing and creating unit when the display set color of the restriction origin monitor area is the emphasized display color, and
the auxiliary image drawing and creating unit receives the color restriction information, searches the restriction target monitor area in the auxiliary image and executes processing required to convert the display color of the restriction target monitor area from the pre-restriction set color to the post-restriction set color.

10. The display device according to claim 1, wherein:
the display color restriction converting unit converts the pre-restriction set color to the post-restriction set color which is differentiated from the pre-restriction set color by a fixed hue or more.

11. The display device according to claim 10, wherein:
the hue of the post-restriction set color is set in a section passing from 5GY through 5GB to 5PB on a hue circle.

12. The display device according to claim 1, wherein:
the display color restriction converting unit converts the pre-restriction set color to the post-restriction set color, which is smaller than the pre-restriction set color in at least one of color saturation and brightness by a fixed amount or more.

13. The display device according to claim 12, wherein:
the display control unit reduces the color saturation of the restriction origin monitor area in the auxiliary image display area together with the surrounding image area.

14. The display device according to claim 1, wherein:
the display color restricting conversion unit finds out a chromaticity coordinate point which is spaced from the chromaticity coordinate point corresponding to the pre-restriction set color on a predetermined chromaticity diagram by a predetermined distance, and sets the display color corresponding to the chromaticity coordinate point as the post restriction set color.

15. A display device for a vehicle comprising:
a display unit having a meter display area and a navigation display area for displaying first information and second information, which vary with operations of the vehicle and are different from each other, respectively; and
a control unit for changing a mode of display of the first information on the meter display area based on the second information on the navigation display area, thereby changing a degree of distinction of the first information from the second information, wherein
the mode of display of the first information that the control unit changes is a color display of the first information, and
the color display of the first information is changed to be different from the color display of the second information.

16. The display device according to claim 15, wherein:
the first information and the second information are a vehicle engine operation condition and a route guidance of a navigation, respectively.

17. A display device for a vehicle comprising:
a display unit having a meter display area for displaying a meter and a navigation data display area for displaying a navigation system, the meter display area including a warning display area for displaying a warning indicator corresponding to a predetermined warning;
a drawing unit for making a drawing on the display unit;
a meter control unit for creating meter information thereby to reflect a display condition of the meter display area on display of the navigation data display area, and transmitting to the drawing unit meter drawing data to be displayed on the meter display area;
a meter information retrieving unit for retrieving the meter information from the meter control unit; and
a navigation control unit for creating meter display navigation data to be displayed in the navigation data display area in accordance with retrieved meter information and transmitting to the drawing unit the meter display navigation data thus created, wherein
the meter information contains display color information of the meter, and wherein
the navigation control unit creates the meter display navigation data so that the meter display navigation data excludes a same color as the warning indicator.

18. The display device according to claim 17, wherein:
the meter information contains at least one of information of character design of the meter, display brightness of the meter, size of the navigation data display area and display position of the navigation data display area in the display unit.

19. A display device for a vehicle comprising:
a display unit having a meter display area for displaying a meter and a navigation data display area for displaying a navigation system, the meter display area including a mechanical meter and a warning display area for displaying a warning indicator corresponding to a predetermined warning;
a drawing unit for making a drawing on the display unit;

a meter control unit for creating meter information thereby to reflect a display condition of the meter display area on display of the navigation data display area;

a meter information retrieving unit for retrieving the meter information from the meter control unit; and a navigation control unit for creating meter display navigation data to be displayed in the navigation data display area in accordance with retrieved meter information and transmitting to the drawing unit the meter display navigation data thus created, wherein the meter information contains display color information of the meter, and wherein the navigation control unit creates the meter display navigation data so that the meter display navigation data excludes a same color as the warning indicator.

20. The display device according to claim 19, wherein:
the meter information contains at least one of information of character design of the meter, display brightness of the meter, size of the navigation data display area and display position of the navigation data display area in the display unit.

21. The display device according to claim 20, wherein:
the navigation control unit creates the meter display navigation data in accordance with the information of character design of the meter.

22. The display device according to claim 20, wherein:
the navigation control unit creates the meter display navigation data in accordance with the information of display brightness.

23. The display device according to claim 20, wherein:
the navigation control unit creates the meter display navigation data in accordance with the information associated with the size of the navigation data display area or the display position of the navigation data display area in the display unit.

24. The display device according to claim 23, wherein:
the navigation control unit changes at least one of a reduction scale, character design and the number of character arrays in a map to be displayed in the navigation data display area in accordance with the information associated with the size of the navigation data display area or the display position of the navigation data display area.

25. A display device for a vehicle comprising:
a display unit having a meter display area for displaying a meter and a navigation data display area for displaying a navigation system;
a drawing unit for making a drawing on the display unit;
a meter control unit for creating meter information thereby to reflect a display condition of the meter display area on display of the navigation data display area, and transmitting to the drawing unit meter drawing data to be displayed on the meter display area;
a meter information retrieving unit for retrieving the meter information from the meter control unit;

a navigation control unit for creating meter display navigation data to be displayed in the navigation data display area in accordance with retrieved meter information and transmitting to the drawing unit the meter display navigation data thus created; and a navigation data processing unit for processing the meter display navigation data, which is related to an area adjacent to the meter display area, in accordance with display content in the meter display area, wherein the meter information contains at least one of information of display color of the meter, character design of the meter, display brightness of the meter, size of the navigation data display area and display position of the navigation data display area in the display unit.

26. The display device according to claim 25, wherein:
the navigation data processing unit changes a display design of the meter display navigation data in the area adjacent to the meter display area so that the display design matches the display content in the meter display area.

27. A display device for a vehicle comprising:
a display unit having a meter display area for displaying a meter and a navigation data display area for displaying a navigation system, the meter display area including a mechanical meter and a warning display area for displaying a warning indicator corresponding to a predetermined warning;
a drawing unit for making a drawing on the display unit;
a meter control unit for creating meter information thereby to reflect a display condition of the meter display area on display of the navigation data display area;
a meter information retrieving unit for retrieving the meter information from the meter control unit;
a navigation control unit for creating meter display navigation data to be displayed in the navigation data display area in accordance with retrieved meter information and transmitting to the drawing unit the meter display navigation data thus created; and
a navigation data processing unit for processing the meter display navigation data, which is related to an area adjacent to the meter display area, in accordance with display content in the meter display area, wherein the meter information contains at least one of information of display color of the meter, character design of the meter, display brightness of the meter, size of the navigation data display area and display position of the navigation data display area in the display unit.

28. The display device according to claim 27, wherein:
the navigation data processing unit changes a display design of the meter display navigation data in the area adjacent to the meter display area so that the display design matches the display content in the meter display area.

* * * * *